United States Patent
Chen

(10) Patent No.: US 12,436,728 B2
(45) Date of Patent: *Oct. 7, 2025

(54) GUIDED COLLABORATIVE VIEWING OF NAVIGABLE IMAGE CONTENT

(71) Applicant: Comcast Cable Communications, LLC, Philadelphia, PA (US)

(72) Inventor: Michael Chen, Wallingford, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/583,280

(22) Filed: Jan. 25, 2022

(65) Prior Publication Data

US 2022/0222028 A1    Jul. 14, 2022

Related U.S. Application Data

(63) Continuation of application No. 15/430,602, filed on Feb. 13, 2017, now Pat. No. 11,269,580.

(51) Int. Cl.
*G06F 3/14*    (2006.01)
*G02B 27/01*    (2006.01)
(Continued)

(52) U.S. Cl.
CPC ......... *G06F 3/1454* (2013.01); *G02B 27/017* (2013.01); *G06F 3/012* (2013.01); *G11B 27/005* (2013.01)

(58) Field of Classification Search
CPC ..... G06F 3/1454; G06F 3/012; G02B 27/017; G11B 27/005
See application file for complete search history.

(56) References Cited

U.S. PATENT DOCUMENTS 11,273,373 B2 * 3/2022 Cotter ............... A63F 13/355
2003/0011714 A1 1/2003 Nevins
(Continued)

OTHER PUBLICATIONS

Chittaro, Luca, Roberto Ranon, and Lucio Ieronutti. "Vu-flow: A visualization tool for analyzing navigation in virtual envrionments." IEEE Transactions on Visualization and Computer Graphics 12.6 (2006): 1475-1485. (Year: 2006).

*Primary Examiner* — Andrew T Chiusano
(74) *Attorney, Agent, or Firm* — Banner & Witcoff, Ltd.

(57) ABSTRACT

Systems, methods, and devices for providing guided collaborative viewing are described herein. In example implementations, a user navigates navigable image content such as immersive content, 360° video, and the like. During the navigation, navigation data is generated that indicates the orientations of the user's view of the navigable image content. Various techniques are employed to obtain variant navigation data from the navigation data generated during the user's navigation. The techniques used to obtain the variant navigation data include techniques to stabilize the orientations of the user's view and smooth transitions between orientations of the user's view. The variant navigation data is provided to another user in order to enable the other user to follow the navigation of the navigable image content. By using the variant navigation data rather than the original navigation data, following the user's navigation may be more comfortable and less disorienting for the other user.

36 Claims, 14 Drawing Sheets

(51) Int. Cl.
   *G06F 3/01*   (2006.01)
   *G11B 27/00*  (2006.01)

(56) References Cited

U.S. PATENT DOCUMENTS

| | | |
|---|---|---|
| 2004/0001705 A1 | 1/2004 | Soupliotis et al. |
| 2006/0061661 A1 | 3/2006 | Grindstaff et al. |
| 2006/0268013 A1 | 11/2006 | Miles |
| 2007/0117635 A1 | 5/2007 | Spanton et al. |
| 2007/0200847 A1 | 8/2007 | Rossler et al. |
| 2010/0253676 A1 | 10/2010 | Mumbauer et al. |
| 2010/0299630 A1 | 11/2010 | McCutchen et al. |
| 2013/0244789 A1 | 9/2013 | Gary |
| 2014/0140677 A1 | 5/2014 | Cho |
| 2014/0364228 A1 | 12/2014 | Rimon |
| 2015/0243078 A1 | 8/2015 | Watson et al. |
| 2015/0375103 A1* | 12/2015 | George ............... A63F 13/497 463/24 |
| 2016/0191796 A1 | 6/2016 | Mate et al. |
| 2016/0202760 A1* | 7/2016 | Churikov ............ G06F 3/0416 345/173 |
| 2017/0003784 A1* | 1/2017 | Garg ................... A63F 13/87 |
| 2017/0053623 A1 | 2/2017 | Purayil et al. |
| 2017/0243324 A1 | 8/2017 | Mierle et al. |
| 2017/0249785 A1 | 8/2017 | Hooper et al. |
| 2017/0269685 A1* | 9/2017 | Marks ................. A63F 13/5252 |
| 2017/0269713 A1 | 9/2017 | Marks et al. |
| 2017/0339341 A1 | 11/2017 | Zhou et al. |
| 2018/0104587 A1* | 4/2018 | Zachwieja ........... A63F 13/497 |
| 2018/0124370 A1 | 5/2018 | Bejot |
| 2018/0176534 A1 | 6/2018 | Herberger et al. |
| 2020/0289935 A1* | 9/2020 | Azmandian .......... A63F 13/53 |

* cited by examiner

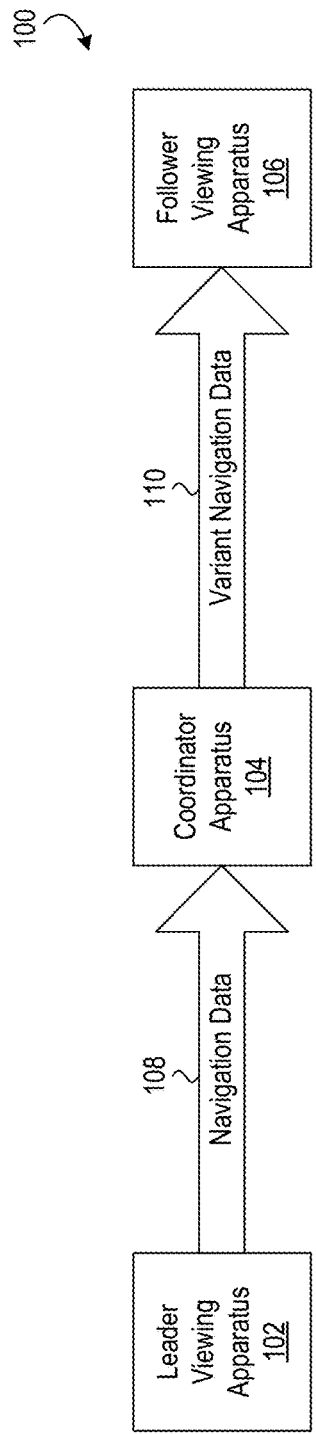
FIG. 1
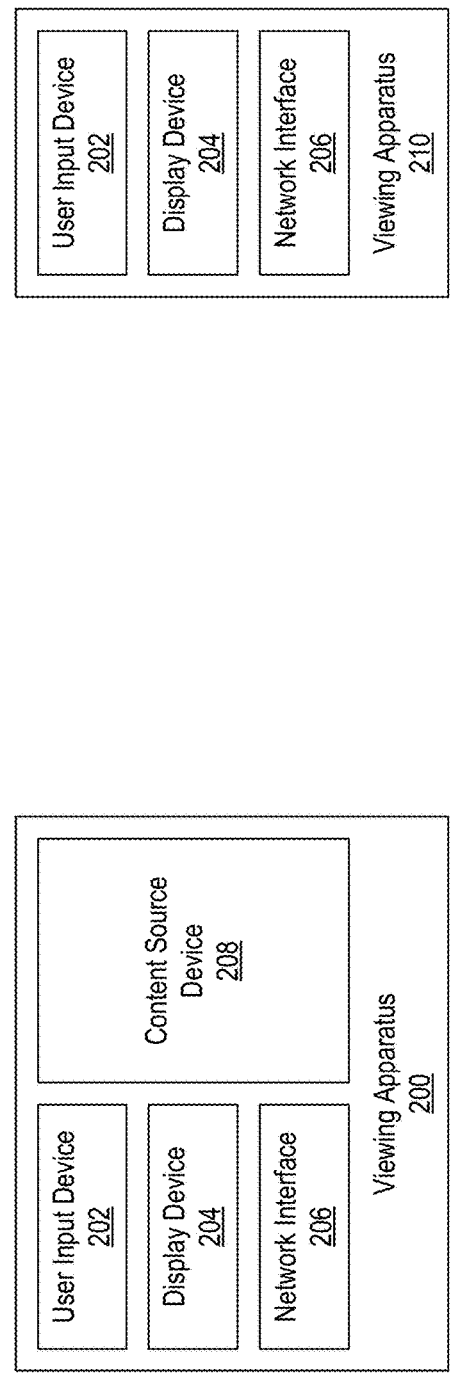
FIG. 2A
FIG. 2B

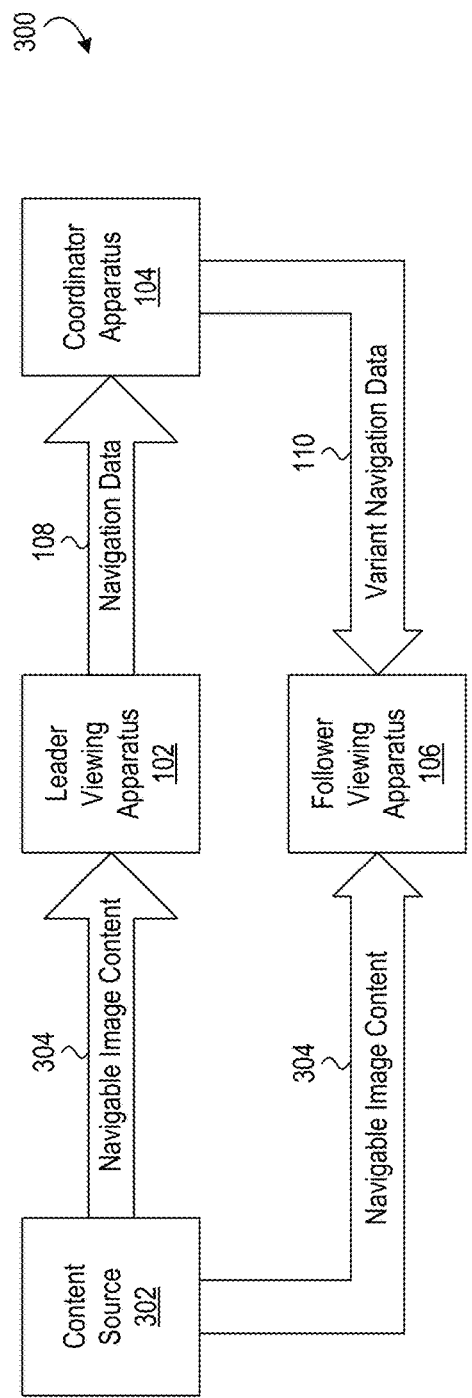
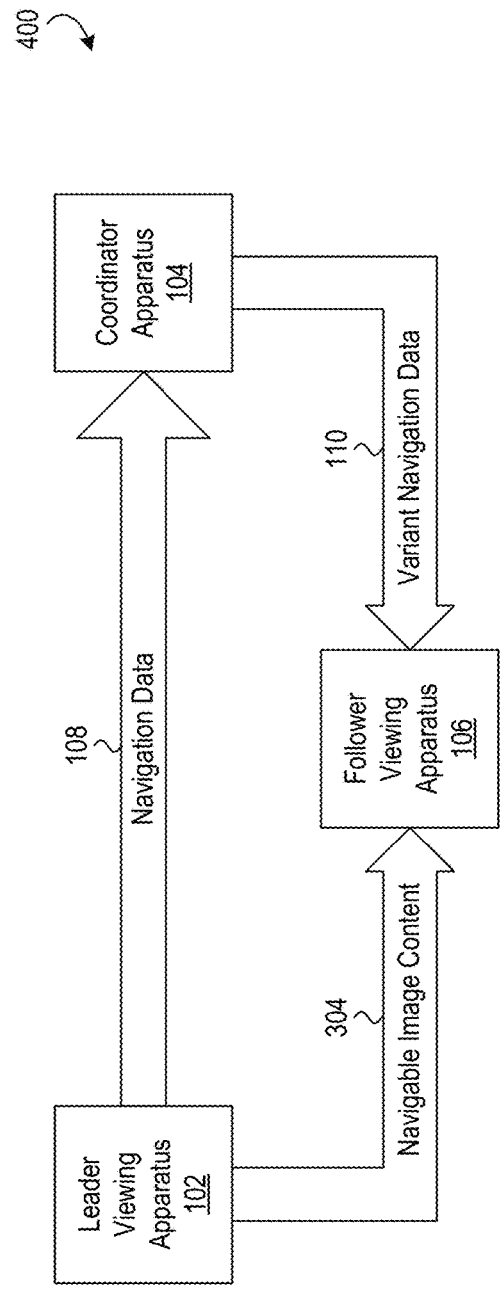
FIG. 3
FIG. 4

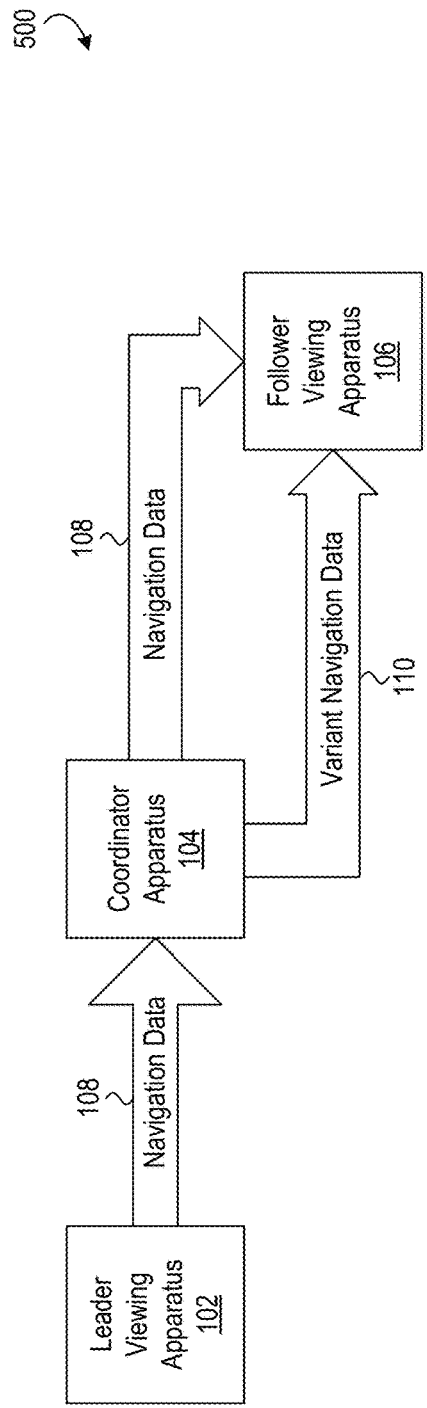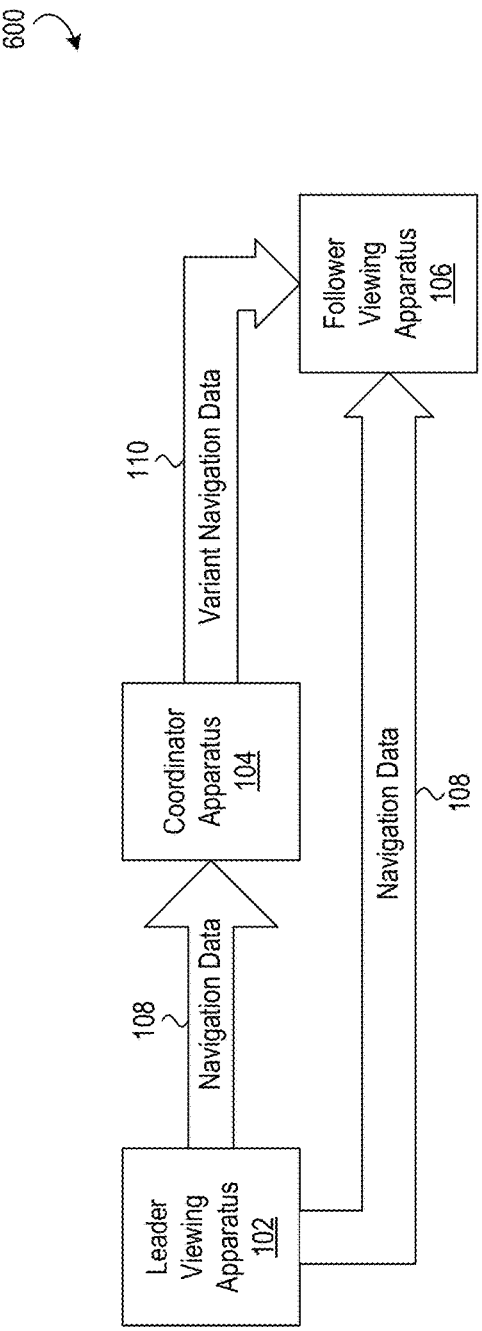

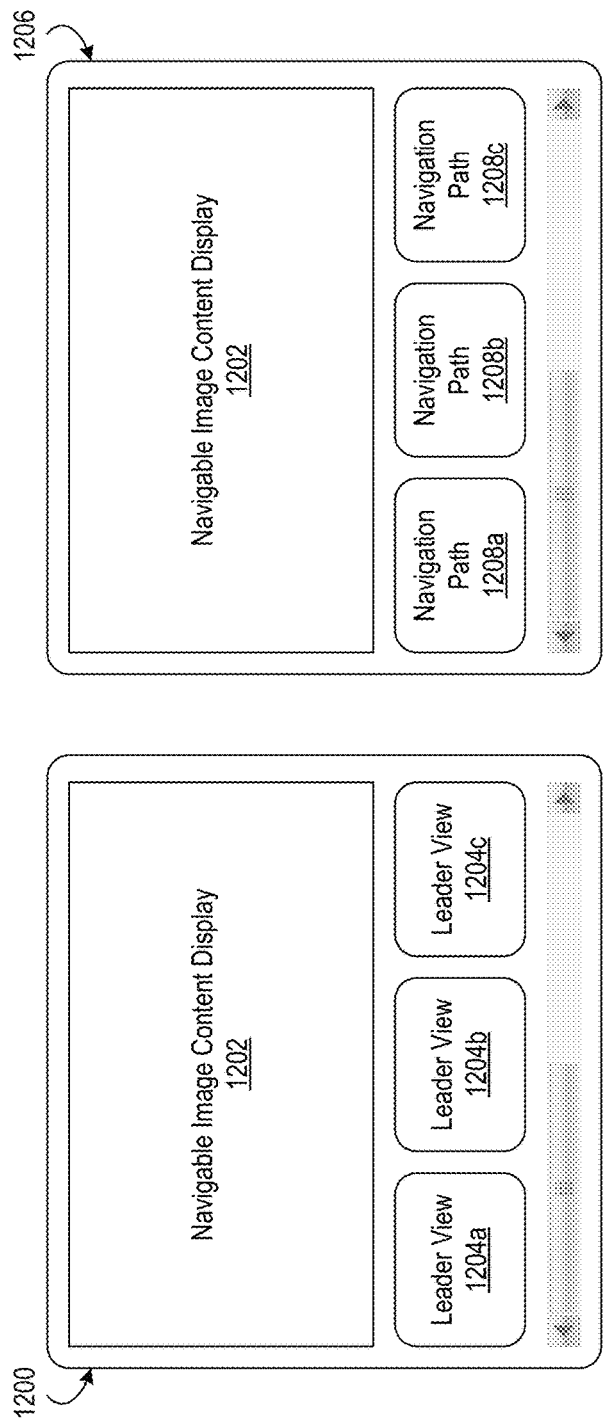
FIG. 12A
FIG. 12B
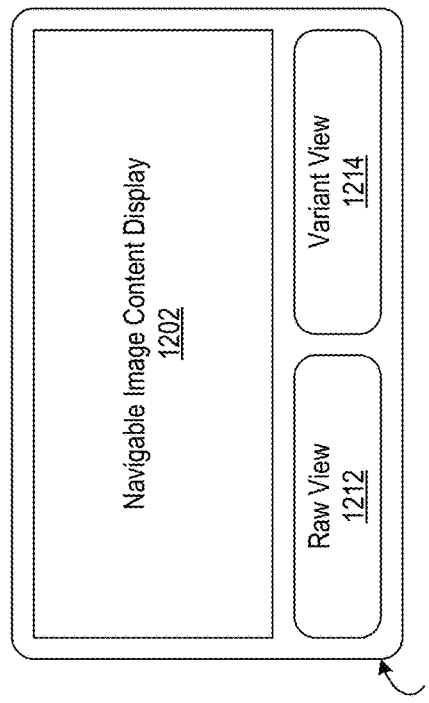
FIG. 12C

GUIDED COLLABORATIVE VIEWING OF NAVIGABLE IMAGE CONTENT

CROSS-REFERENCE TO RELATED APPLICATIONS

This application is a continuation of U.S. application Ser. No. 15/430,602, filed Feb. 13, 2017, which is hereby incorporated by reference in its entirety.

BACKGROUND

Advancements in computing technologies have changed the way users interact with visual images presented at display devices. Rather than simply view the visual images, user interface controls permit users to manipulate the visual images presented. In some instances, users may wish to share with others their interactions with and manipulations of visual images. The types of visual images and the manner of interacting with them continue to grow. As such, there remains an ever-present need for techniques to improve the manner of sharing interactions with and manipulations of visual images.

SUMMARY

The following presents a simplified summary in order to provide a basic understanding of the disclosures herein. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Techniques for providing guided collaborative viewing are described herein. In example implementations, a user navigates navigable image content such as immersive content, 360° video, and the like. During the navigation, navigation data is generated that indicates the orientations of the user's view of the navigable image content. Various techniques are employed to obtain variant navigation data from the navigation data generated during the user's navigation. The techniques used to obtain the variant navigation data include techniques to stabilize the orientations of the user's view and smooth transitions between orientations of the user's view. The variant navigation data is provided to another user in order to enable the other user to follow the navigation of the navigable image content. By using the variant navigation data rather than the original navigation data, following the user's navigation may be more comfortable and less disorienting for the other user.

The navigation data generated may take various forms. For example, the navigation data may indicate the orientations of the user's view using coordinates that indicate the orientations with respect to a coordinate system or using angles that indicate the orientations as rotations about multiple axes.

The variant navigation data may be obtained to provide a more enjoyable viewing experience for a user that follows another user's navigation of the navigable image content. For example, the variant navigation data may be configured such that playback of the navigable image content stabilizes the view and smoothes transitions between orientations of the view. The variant navigation data may also result in a slower rate of change between orientations when following another user's navigation of the navigable image content.

Users may follow a navigation of navigable image content in real-time or subsequent to the navigation. The navigation data may be stored for subsequent retrieval and delivery to users during playback of navigable image content. Users may select to follow one of multiple users that are currently or have previously navigated an item of navigable image content. The navigation data generated during navigation of navigable image content may also be utilized to derive new image content based on that navigation, e.g., a 2D presentation of a particular navigation of the navigable image content. The new image content may be stored and subsequently delivered to users for playback, e.g., via a content delivery system.

Additional features associated with guide collaborative viewing of navigable image content will be appreciated with the benefit of the disclosures set forth in further detail below.

BRIEF DESCRIPTION OF THE DRAWINGS

Some features herein are illustrated by way of example, and not by way of limitation, in the accompanying drawings. In the drawings, like numerals reference similar elements between the drawings.

FIG. 1 depicts example components of a guided collaborative viewing system.

FIG. 2A depicts an example implementation of a viewing apparatus.

FIG. 2B depicts an example implementation of a viewing apparatus.

FIG. 3 depicts an example implementation of a guided collaborative viewing system.

FIG. 4 depicts an example implementation of a guided collaborative viewing system.

FIG. 5 depicts an example implementation of a guided collaborative viewing system.

FIG. 6 depicts an example implementation of a guided collaborative viewing system.

FIG. 12A depicts an example implementation of an interface at a follower viewing apparatus for selecting a view of navigable image content.

FIG. 12B depicts an example implementation of an interface at a follower viewing apparatus for selecting a view of navigable image content.

FIG. 12C depicts an example implementation of an interface at a follower viewing apparatus for selecting a view of navigable image content.

DETAILED DESCRIPTION

Figure 7:
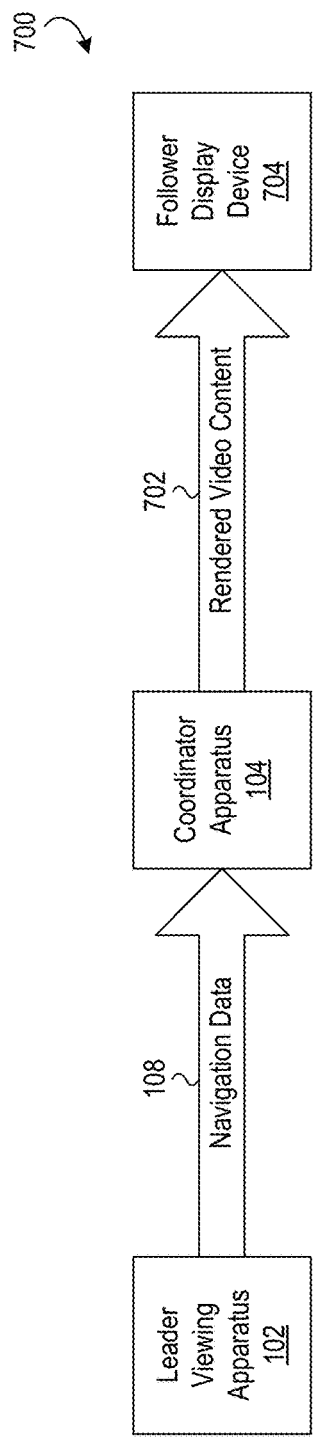
FIG. 7 depicts an example implementation of a guided collaborative viewing system.

In the following description of various illustrative implementations, reference is made to the accompanying drawings identified above, which form a part hereof, and in which is shown by way of illustration the disclosures herein may be practiced. Other implementations may be utilized and structural and functional modifications may be made, without departing from the scope discussed herein. The disclosures are capable of other implementations and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. In addition, the use of "set" is meant to encompass a collection of one or more elements.

To illustrate the principles described in further detail below, the following example is provided in the context of guided collaborative viewing of immersive video content. Immersive video content includes 360° video such as that captured by an omnidirectional camera. During playback of the immersive content, a viewer can control the viewing direction. For the purposes of this example, a viewer can present the immersive content at a head-mounted display (HMD) which includes both the display device that displays the immersive content as well as the manner of controlling the viewing direction. An HMD, for example, may include sensors that detect the movement of the viewer's head (e.g., up/down and left/right) and provide sensor data corresponding to those movements to a display controller at the HMD. The display controller may then update the display of the immersive content to present that portion of the immersive content which corresponds to the viewer's viewing direction.

It will be appreciated that playback of the immersive content, in this example, is a solitary experience in which only the viewer perceives the navigation through the immersive content via the HMD. Others may desire to follow along as the viewer navigates the immersive content. Enabling others to following along, however, can present challenges. One challenge includes formatting the immersive content for the follower's display device which may not be the same as the viewer's display device. For example, although a viewer may navigate immersive content via an HMD, a follower might follow the viewer's view on a two-dimensional (2D) display device. Formatting the immersive content for presentation on the 2D display device can be computationally expensive and thus inhibit the follower's ability to follow the viewer's view in real-time or near real-time. This challenge is exacerbated when the viewer and the follower are located remotely relative to each other and the immersive content is delivered to the follower over a network. An additional challenge includes providing the follower with a view of the viewer's view that is comfortable for the follower to view. In some instances, the viewer's navigation of the immersive content may involve quick movements (e.g., due to a quick head turn), jitter, askew orientations, and the like. Followers might find these and other aspects of the viewer's view distracting or disorienting thereby diminishing the follower's viewing experience. The techniques described herein for providing guided collaborative viewing seek to address and overcome these and other challenges.

For the purpose of convenience, the following terminology is adopted to illustrate the principles disclosed herein. These terms, however, should not be construed as limiting on the subject matter set forth in the claims below.

The disclosures herein describe guided viewing of navigable image content. Navigable image content includes image content in which the dimensions of the image content extend beyond the field-of-view of the display device that displays the image content and in which a user can control which portion of the image content is displayed within the field-of-view. Navigable image content includes static images and video images. Navigable image content includes panoramic images and panoramic video. The panoramic images and the panoramic video may have a field-of-view up to and including 360° along one or more axes, e.g., the X-axis, the Y-axis, and/or the Z-axis. Navigable image content includes image content captured by one or more image capture devices (e.g., an omnidirectional camera, a camera array having multiple cameras), image content rendered by a graphics pipeline (e.g., a 3D scene such as a virtual world, a video game rendered by a gaming machine), and image content stored at a data store (e.g., an image file, a video file). Navigable image content may be stored using various image formats or video formats. Stored navigable image content may be addressable, e.g., using filename or a Uniform Resource Identifier (URI) such as a Uniform Resource Locator (URL). Portions of stored navigable image content may also be addressable, e.g., by specifying a playback time or a frame number. Navigable image content may also be encoded using various encoding standards. For example, navigable image content received as a raw image stream may be encoded using different encoders to generate multiple versions for that raw image stream at different bitrates, e.g., a high-resolution version, a medium-resolution version, and a low-resolution version. As another example, navigable image content may be encoded using multiple encoders each configured to encode image content for a particular computing platform (e.g., iOS, Android, Windows) to generate different versions of the image content for multiple computing platforms. One type of navigable image content is immersive content discussed in the example above. Other types of navigable image content will be appreciated with the benefit of this disclosure.

Navigable image content may also include or otherwise be associated with metadata. The metadata may characterize the navigable image content, provide information about the navigable image content, and/or provide settings associated with the navigable image content. The metadata may indicate, for example, a default playback position, a default orientation for the view of the navigable image content upon initial playback, an image format or video format of the navigable image content, a resolution of the navigable image content, a data size of the navigable image content, an encoding used to encode the navigable image content, a compression technique used to compress the navigable image content, a device type used to obtain the navigable image content, a date and/or time the navigable image content was obtained. The metadata may also, in some examples, indicate omissions, occlusions, or errors in the portions or areas of the navigable image content. As described in further detail below, navigation data may be modified so as to not expose or otherwise prevent followers from encountering the omissions, occlusions, and/or errors.

The metadata for navigable image content, in some examples, further include indications of multiple reference points from which an item of navigable image content can be followed. For example, navigable image content may be obtained using a camera array having multiple cameras as noted above. Each camera of the camera array, in this example, may provide a reference point from which the navigable image content may be navigated according to collected navigation data. A leader may thus navigate the navigable image content from a reference point corresponding to a first camera of the camera array, and a follower may follow the leader's navigation from a reference point corresponding to a second camera, third camera, etc. of the camera array during playback of the navigable image content. The follower may, for example, switch between the available reference points while following the leader's navigation. In another example, consider a "robot battle" scenario in which one of the entrants includes both a ground vehicle and an aerial vehicle (e.g., a drone.) The navigable image content, in this example, may be immersive video obtained by a camera of the ground vehicle, and the ground vehicle may generate navigation data corresponding to its movements during the battle. The ground vehicle and the aerial vehicle may thus provide two reference points from which a follower may follow the ground vehicle's navigation during playback of the immersive content depicting the battle. The follower may thus select and switch between these two reference points as desired in order to follow the navigation from different perspectives. To permit followers to select from multiple reference points, the metadata may include a list of the available reference points associated with the navigable image content as well as the position of the reference points relative to each other (or relative to a standard origin point). For example, one reference point may be designated as the primary reference point and the remaining reference points designated as secondary reference points. The metadata may indicate the locations of the secondary reference points to the primary reference point using, e.g., relative coordinates. Additional and alternative approaches may be selectively employed to indicate the positions of the reference points relative to each other. The locations of the reference points may, in turn, be employed during playback of the navigable image content for the follower in order to determine the orientation of the view of the navigable image content.

A viewer may navigate the navigable image content in various ways. Navigating navigable image content may be described with respect to a set of axes that are each perpendicular with respect to each other such as those used in a coordinate system. For example, a first axis may extend horizontally with respect to the view, a second axis may extend vertically with respect to the view, and a third axis may extend away from the view. Navigable image content includes navigable image content that may be navigated with respect to one, two, or all three of these axes. Examples of navigable image content that is navigable along one axis include panoramic images and panoramic videos which a viewer may navigate either horizontally along the first axis, vertically along the second axis, or along the third axis (e.g., by zooming in/out). Examples of navigable image content that is navigable along two axes include panoramic images and panoramic videos which a viewer may navigate both horizontally and vertically along the first and second axis respectively. An example of navigable image content navigable along three axes includes a 3D space which a viewer may navigate in all three dimensions.

Navigating the navigable image content includes changing the orientation of the view of the navigable image content. Changing the orientation of the view includes changing the focal point of the view from a fixed position relative to the navigable image content and includes changing the position of the view relative to the navigable image content itself. Changing the focal point of the view from a fixed position includes tilting the view, panning the view, and rolling the view with respect to that fixed position. Tilting the view, as used herein, refers to rotating the view about the first (horizontal) axis to move the view up/down. Tilting the view may also be understood as adjusting the pitch of the view with respect to a pitch axis. Panning the view, as used herein, refers to rotating the view about the second (vertical) axis to move the view left/right. Panning the view may also be understood as adjusting the yaw of the view with respect to a yaw axis. Rolling the view, as used herein, refers to rotating the view about the third (depth) axis to position the view at an oblique angle between vertical and horizontal. Rolling the view may also be understood as adjusting the roll of the view with respect to a roll axis. Changing the position of the view with respect to the navigable image content includes strafing the view along one or more of the axes. Strafing includes moving the view horizontally along the first axis which corresponds to moving the view from side-to-side with respect to the navigable image content. Strafing also includes moving the view vertically along the second axis which corresponds to moving the view from top-to-bottom with respect to the navigable image content. Strafing further includes moving the view along the third axis which may corresponds to zooming in/out or moving forward/backward (e.g., through a 3D space). It will be appreciated that a viewer may simultaneously perform various combinations of these actions while navigating the navigable image content, e.g., moving the view forward through a 3D space while panning the view, simultaneously panning and tilting the view, and the like. Additional and alternative combinations of navigation actions will be appreciated with the benefit of this disclosure.

A viewer views navigable image content at a viewing apparatus. A viewer that views navigable image content and controls the view of the navigable image content is referred to herein as the "leader." A viewer that views navigable image content for which another viewer controls the view is referred to herein as a "follower." A leader's viewing apparatus is thus referred to herein as a "leader viewing apparatus," and a follower's viewing apparatus is referred to herein as a "follower viewing apparatus." As described in further detail below, multiple followers may follow a leader's view as the leader navigates navigable image content. In addition, a follower may select one of multiple leaders to follow that are each navigating, or have previously navigated, navigable image content. Furthermore, a viewer may switch between following another leader's view and taking independent control of the view of the navigable image content. A follower may view a leader's current view of the navigable image content in real-time or near real-time. A leader's navigation through navigable image content may also be recorded, stored, and provided to a follower for subsequent playback of the navigable image content according to the leader's previous navigation.

Referring now to FIG. 1, example components of a guided collaborative viewing system 100 is shown. The guided collaborative viewing system 100 includes a leader viewing apparatus 102 communicatively connected with a coordinator apparatus 104 which is, in turn, communicatively connected to a follower viewing apparatus 106. While a leader navigates navigable image content using the leader viewing apparatus 102, the leader viewing apparatus generates navigation data 108 and sends the navigation data to the coordinator apparatus 104. The coordinator apparatus 104 is configured to process the navigation data 108 received from the leader viewing apparatus 102 and generate variant navigation data 110. The coordinator apparatus 104 then sends the variant navigation data 110 to the follower viewing apparatus 106. Having received the variant navigation data 110, the follower viewing apparatus 106 may utilize the variant navigation data 110 received during playback of the navigable image content in order to follow the leader's navigation through the navigable image content.

The variant navigation data 110 is generated in order to provide a positive viewing experience for the follower. A negative viewing experience may result for various reasons. For example, a leader's quick and unexpected movements may disorient a follower, may result in motion blur that obscures the content viewed by the follower, or cause the follower to miss content and/or events that may be of interest to the follower. In addition, jitter or shakiness resulting from the leader's control input may be distracting and/or annoying to a follower. To facilitate a positive viewing experience, the coordinator apparatus 104 employs various techniques to address some of these undesirable effects. Such techniques will be discussed in further detail below but generally include techniques to stabilize the image (image stabilization techniques), techniques to control the playback rate of the navigable image content (time-dilation techniques), techniques to manipulate the presentation of the navigable image content (image manipulation techniques), and the like. Image stabilization techniques may include smoothing changes to the orientation of the view, filtering the navigation data, curve fitting the navigation data, dejitterizing the navigation data, and the like. Time-dilation techniques may include slowing down or speeding up changes to the orientation of the view, in other words adjusting the rate of change between orientations. One example of a time-dilation technique may be described in the context discussed above with respect to a leader's HMD used to navigate immersive content. A split-second turn of the leader's head with the HMD may be extended in time during playback of the immersive content for the follower. Variant navigation data may be generated based on the navigation data corresponding to the leader's head turn, and the variant navigation data may identify a relatively slower rate of change thereby enabling the follower to better perceive the leader's head turn. Image manipulation techniques include the addition of motion blur, altering the size and/or shape of the view of the navigable image content, and the like. Additional and alternative examples will be appreciated with the benefit of this disclosure.

The navigation data 108 indicates how a viewer navigates or has navigated navigable image content over time. As noted above, navigating the navigable image content includes changing the orientation of the view of the navigable image content. The navigation data 108 thus includes a time-series of orientations relative to the navigable image content. For the sake of convenience, a single instance of navigation data 108 is described herein as including an orientation at a particular time. As described in further detail below, orientation data and time data may be obtained that respectively indicate the orientation of the viewer's view of the navigable image content at the particular time. The orientation data may be specified with respect to a reference point relative to the navigable image content. As also described in further detail below, the viewer may change the reference point with respect to the navigable image content, for example, in the context of a 3D virtual world navigated by the viewer. The navigation data 108 may thus include, in some implementations, the position of reference point with respect to the navigable image content at the particular time. The time data may be specified in terms of an absolute time and thus include a timestamp indicating a specific date and a specific time for the orientation and/or reference position (e.g., Feb. 24, 2016; 06:11:00:00). The time data may also be specified in terms of a duration, for example, an amount of time that has elapsed since the viewer began navigating the navigable image content (e.g., seconds, milliseconds, nanoseconds, etc.). The time data may be obtained or measured by a clock or another type of timing component of the viewing apparatus.

The navigation data 108 may come in a variety of forms. The form of the navigation data 108 may include, for example, a set of coordinates corresponding to a coordinate system, a set of rotation angles measured with respect to a coordinate system, a set of dimensions corresponding to a portion of the navigable image content, a set of parameterized operations, and the like. It should be recognized that these examples and the examples set forth below are simply provided to illustrate the principles associated with the navigation data 108. Additional and alternative examples will be appreciated with the benefit of this disclosure. In addition, particular implementations may format and/or encode the navigation data 108 according to the practical constraints imposed by those implementations, e.g., with respect to the hardware, software, protocols, and the like that are utilized to construct those implementations.

The navigation data 108 may be expressed as coordinate values of various types of coordinate systems. The set of coordinates may include coordinates of a two-dimensional (2D) coordinate system (e.g., an X-coordinate and a Y-coordinate) or coordinates in a three-dimensional (3D) coordinate system (e.g., an X-coordinate, a Y-coordinate, and a Z-coordinate). Coordinates may be utilized to specify both the focal point of the viewer and the reference point from which the focal point is measured. One example of a format for navigation data 108 indicating a viewer's orientation in a 2D coordinate system may be: {reference_point_coordinates(X, Y), focal_point_coordinates(X, Y), time}. An example of navigation data 108 that may be formatted using this example format may thus be: [{(0, 0), (5, 25), 0:00:01}, {(0, 0), (5, 35), 0:00:02}, {(0, 0), (5, 45), 0:00:03}, . . . ], which indicates a viewer navigating navigable image content from a reference point of (0,0) by changing the view along the Y-axis (from Y-axis coordinate 25 to 45) over a duration of three seconds. A similar example of a format for navigation data 108 indicating a viewer's orientation in a 3D coordinate system may be: {reference_point_coordinates(X, Y, Z), focal_point_coordinates(X, Y, Z), time}. An example of navigation data 108 that may be formatted using this example format may thus be: [{(0, 0, 0), (25, 50, 75), 0:00:01}, {(0, 0, 15), (25, 50, 75), 0:00:02}, {(0, 0, 30), (25, 50, 75), 0:00:03}, . . . ], which indicates a viewer navigating navigable image content by changing the reference point of the view along the Z-axis over a duration of three seconds while maintaining the same focal point. Additional examples will be appreciated.

The navigation data 108 may also be expressed as rotation angles measured relative to the axes of various types of coordinate systems. The rotation angles may indicate rotations about the axes of a coordinate system. The rotations indicated by the rotation angles may be intrinsic rotations or extrinsic rotations. The set of rotation angles may include rotation angles measured relative to the axes of a 2D coordinate system or rotation angles measured relative to the axes of a 3D coordinate system. The rotation angles may be expressed in terms of degrees (e.g., 24°) or radians (e.g., 0.418 rad). Other units may be selectively employed to indicate the rotations that indicate the orientation of the viewer's view of the navigable image content. One example of a format for navigation data 108 indicating a viewer's orientation in a 2D coordinate system may be: {reference_point_coordinates(X, Y), x_axis_rotation, y_axis_rotation, time}. An example of navigation data 108 that may be formatted using this example format may thus be: [{(0, 0), 35°, 22°, 0:00:01}, {(0, 0) 35°, 27°, 0:00:02}, {(0, 0), 35°, 32°, 0:00:03}, . . . ], which indicates a viewer navigating navigable image content from a reference point of (0, 0) by rotating the view about the Y-axis over a duration of three seconds. A similar example of a format for navigation data 108 indicating a viewer's orientations in a 3D coordinate system may be: {reference_point_coordinates(X, Y, Z), x_axis_rotation, y_axis_rotation, z_axis_rotation, time}. An example of navigation data 108 that may be formatted using this example format may thus be: [{(0, 0, 0), 35°, 22°, 0°, 0:00:01}, {(0, 0, 0) 40°, 27°, 0°, 0:00:02}, {(0, 0, 0), 45°, 32°, 0°, 0:00:03}, . . . ], which indicates a viewer navigating navigable image content from a reference point of (0, 0, 0) by rotating the view about both the X-axis and Y-axis over a duration of three seconds. Additional examples will be appreciated.

The navigation data 108 may also be expressed as dimensions that correspond to a portion of the navigable image content. The set of dimensions may be understood as defining a "window" that provides the view of the portion of the navigable image content. In this regard, the set of dimensions may include, for each of the horizontal and vertical direction of the navigable image content, a starting point and an ending point. The starting and ending points may thus define the length and width of the "window" used to view the navigable image content. The starting point of the "window" may, e.g., its top-left corner, its bottom-right corner, its center, and the like. The starting and ending points may be expressed in terms of a global coordinate system to which the navigable image content conforms or in terms of their position relative to a reference point (e.g., an origin point) of the navigable image content. One example of a format for navigation data 108 indicating the dimensions of a "window" used to view navigable image content may be: [horizontal_start, horizontal_end, vertical_start, vertical_end, time]. An example of navigation data 108 that may be formatted using this example format may thus be: [{50 px, 550 px, 50 px, 225 px, 0:00:01}, {100 px, 650 px, 50 px, 225 px, 0:00:02}, {150 px, 700 px, 50 px, 225 px, 0:00:03}, . . . ], which indicates a viewer navigating navigable image content by panning a "window" rightward across the navigable image content over a duration of three seconds. Alternatively, the set of dimensions may specify a starting point and a number of units (e.g., pixels, millimeters, centimeters, etc.) the "window" should extend in each of the horizontal and vertical directions. One example of a format for navigation data 108 indicating the dimensions of a "window" in this alternative approach may be: [horizontal_start, length, vertical_start, width, time]. An example of navigation data 108 that may be formatted using this alternative example format may thus be: [{50 px, 500, 50 px, 225, 0:00:01}, {50 px, 500, 100 px, 225, 0:00:02}, {50 px, 500, 150 px, 225, 0:00:03}, . . . ], which indicates a viewing navigating navigable image content by panning a "window" downward across the navigable image content over a duration of three seconds. Additional examples will be appreciated.

The navigation data 108 may also be expressed in terms of the difference between the current orientation of the viewer's view and a previous orientation of the viewer's view. Expressing the navigation data 108 in this way may advantageously reduce the amount of memory, storage, and bandwidth used to store and transmit the navigation data. This technique may be employed whether the navigation data 108 is expressed as a set of coordinates, a set of rotation angles, a set of dimensions, or some other approach. In this example, the navigation data 108 may include an initial orientation, e.g., an initial set of coordinates, rotation angles, or dimensions indicating an initial view of the navigable image content. Subsequently, the navigation data 108 may indicate the series of changes from this initial view as the viewer navigates the navigable image content. For example, where the navigation data 108 is expressed as a set of rotation angles as described above, an initial rotation angle may be: {(0, 0, 0), 0°, 0°, 0°, 0:00:00}, which indicates a viewer initially viewing navigable image content from a reference point of (0, 0, 0) with no rotation about the coordinate axes. As the user navigates the navigable image by panning leftward and upward, example navigation data 108 indicating this navigation may include: [{(0, 0, 0), −5°, +3°, 0°, 0:00:01}, {(0, 0, 0), −4°, +2°, 0°, 0:00:02}, {(0, 0, 0), −3°, +4°, 0°, 0:00:03}, . . . ], in which each successive instance of navigation data indicates the change in rotation about the respective axes from the previous instance of navigation data. In this particular example, the rotation about the X-axis is thus −5° at time 0:00:01 (0°−5°), −9° at time 0:00:02 (−5°−4°), and −12° at time 0:00:03 (−9°−3°). The rotation about the Y-axis proceeds in a similar fashion. Similar examples will be appreciated with respect to navigation data expressed as a set of coordinates or a set of dimensions.

The navigation data 108 may also be expressed as parameterized operations of the viewer. The operations may include actions a viewer can take with respect to the navigable image content, e.g., "turn left," "turn right," "move forward," "move backward," "strafe left," "strafe right," "raise," "lower," "look up," "look down." A value may accompany each operation to indicate the extent to which to perform the action, e.g., "move forward 60," "turn left 35," "rise 15." The navigation data 108, in this example, may thus correspond to a sequence of operations. In some instances, multiple operations may be performed in serial one after the other. In some instances, multiple operations may be performed in parallel at the same time. One example of a format for navigation data 108 implemented as parameterized operations may be: {operation, value, sequence_number}. The sequence number may indicate the order in which to perform the operations. Two operations may have the same sequence number to indicate those operations should be performed in parallel. An example of navigation data 108 that may be formatted using this example format may thus be: [{"move forward," 25, 1}, {"turn left," 15, 2}, {"strafe right," 50, 3}, {"look up," 10, 3}], which indicates a viewer navigation navigable image content by first moving forward for a value of 25, then turning left for a value of 15, and then strafing to the right for a value of 50 while simultaneously looking up for a value of 10. The values accompanying the operations may correspond to the dimensions used to define the navigable image content. Additional examples will be appreciated.

The navigation data 108 may also be obtained in a variety of ways. For example, the viewer's current view of the navigable image content may be sampled at regular intervals (e.g., n times per unit time) in order to generate the navigation data 108. In some implementations, the coordinator apparatus 104 may perform the sampling of the viewer's current view and generate the corresponding navigation data 108. In other implementations, a component of the leader viewing apparatus 102 may perform the sampling of the viewer's current view and send the navigation data 108 generated to the coordinator apparatus 104. It will be appreciated that sampling the viewer's current view at regular intervals may generate corresponding navigation data 108 even when the viewer's current view of the navigable image content has not changed potentially resulting in redundant navigation data. In some instances, it may be desirable to obtain all the navigation data 108 that is available, even redundant navigation data. This may be the case where, for example, a follower wants to faithfully follow a leader's precise navigation of the navigable image content. However, where computing resources are limited (e.g., memory, storage, bandwidth), avoiding redundant navigation data may be desirable. As another example, the navigation data 108 may be generated only in response to changes of the viewer's current view of the navigable image content. In other words, changing the current view of the navigable image content may trigger the generation of navigation data 108, e.g., new navigation data indicating the new orientation of the view. This example approach may thus avoid generating redundant navigation data 108 when the viewer's current view of the navigable image content has not changed.

The coordinator apparatus 104 is configured to obtain the variant navigation data 110 and provide it to the follower viewing apparatus 106. The variant navigation data 110 may be expressed in the same fashion as the navigation data 108, e.g., as a set of coordinates, a set of rotation angles, or a set of dimensions. In some implementations, the follower viewing apparatus 106 may be the same type of viewing apparatus of the leader viewing apparatus 102. In these implementations, the variant navigation data 110 may have the same format as the navigation data 108. In other implementations, however, the follower viewing apparatus 106 may not be the same type of viewing apparatus as the leader viewing apparatus 102. For example, the leader might navigate a 3D version of the navigable image content (e.g., immersive content) using an HMD while a follower follows along at a 2D display device displaying a 2D version of the navigable image content. In this situation, the navigation data 108 obtained may be formatted with respect to the HMD and the 3D version of the navigable image content while the variant navigation data 110 may have a format suitable for updating the view of the 2D version of the navigable image content at the follower's 2D display device. Obtaining the variant navigation data 110 may thus include translating the navigation data 108 into a format suitable for use at the follower viewing apparatus 106. Various types of viewing apparatuses will be discussed in further detail below with respect to FIGS. 2A-B.

Obtaining the variant navigation data 110 includes additional and alternative operations. For example, obtaining the variant navigation data 110 may include modifying, removing, or adding to at least a portion of the navigation data 108 received. Obtaining the variant navigation data 110 also includes generating new navigation data based on at least a portion of the navigation data 108 received, e.g., deriving new navigation data. Obtaining variant navigation data 110 further includes associating instructions with the navigation data 108 received, the instructions indicating how a follower viewing apparatus 106 should utilize the orientation data provided to it. One example of such an instruction includes an instruction specifying the playback rate for a change between orientations. In this example, the coordinator apparatus 104 may receive navigation data 108 from a leader viewing apparatus 102 indicating a 30° change in the orientation of the leader's view over a duration of a quarter second (0.25 s). In order to make this change more comfortable for the follower, the coordinator apparatus 104 may transmit variant navigation data 110 to the follower's follower viewing apparatus 106 that indicates the 30° orientation change along with an instruction to extend the duration of the orientation change to one second (1 s). As described in further detail below, various techniques for analyzing and processing a time-series may be selectively employed to obtain the variant navigation data 110 from the navigation data 108 received.

Modifying the navigation data 108 includes changing one or more values of the navigation data. For example, changing the values of the navigation data 108 may include changing one or more coordinates in the set of coordinates, changing one or more rotation angles in the set of rotation angles, or changing one or more dimensions in the set of dimensions. Changing the values of the navigation data 108 may also include changing the times, e.g., changing the timestamps or durations received. The coordinator apparatus 104 may be configured to modify the navigation data 108 in order to obtain variant navigation data 110 that smoothes the transition between different orientations of the leader's view. The coordinator apparatus 104 may be configured to employ various functions and/or algorithms suitable for smoothing the navigation data 108 in order to generate the variant navigation data 110, e.g., linear transformations, moving averages, exponential smoothing, local regression, curve fitting, and the like. For example, the coordinator apparatus 104 may be configured to fit the orientation information of the navigation data 108 to a curve and then utilize that curve to adjust the values of the orientation information such that it lies on the curve identified.

The navigation data may be modified to constrain the values of the navigation data. Various techniques may be selectively employed to constrain the values including, for example, rounding, floor functions, ceiling functions, maximum functions, minimum functions, and the like. Constraining the navigation data may be employed, for example, to hide omission, occlusions, and/or errors in the navigable image content as noted above. For example, an item of navigable image content may have a 180° field-of-view in both the horizontal and vertical directions. Navigation data obtained while navigating this example navigable image content may thus be modified to limit any changes in the orientation of the leader's view to keep the orientation within the 180° field-of-view during playback for the follower. In addition, navigation data may be constrained such that the reference point for the view of the navigable image content is limited to a defined range. Navigation data may thus be modified to limit changes to the leader's reference point to keep the reference point within the defined range during playback for the follower. Furthermore, opposing or supporting forces may be modeled and applied to the navigation data so as to constrain (or enhance) the navigation data according to those forces. The forces that may be modeled and applied to the navigation data may be associated with the environment depicted in the navigable image content, e.g., wind, features of the terrain (water, ice, paved), moments of inertia, and the like. Inverse kinematics techniques may be employed to determine the modifications to the navigation data based on the opposing or supporting force.

Constraining the navigable image content as described above may also be employed so as to cultivate a particular experience for and/or elicit a particular feeling or response from a follower during playback of the navigable image content. For example, changes to the reference point of the view of the navigable image content may be limited to a relatively small range (e.g., a defined radius) so as to provide a "prisoner-in-chains" experience for the follower. As another example, changes to the orientation of the view may be limited to a relatively small range (e.g., a defined arc length) so as to provide a "tunnel" experience for the follower. Further examples include an opposing force that may be applied to the navigation data so as to provide a "windy" experience for the follower, in other words modifying the navigation data such that the follower feels as if the navigation is more difficult due to strong winds. The navigation data may also be constrained so as to reproduce in the navigable image content similar constraints on individuals navigating the physical world, in particular the scarcity of physical space. In the physical world, individuals are constrained by the presence of others such that the individual cannot occupy the same physical space as another individual at the same time. These constraints of the physical world, however, are not present when navigating navigable image content such as immersive content. In some instances, however, it may be desirable to apply similar constraints to navigation of navigable image content in order to simulate the experience of having multiple observers present. For example, a follower may be constrained from shifting the reference point of the current view of the navigable image content (e.g., forward, backward, or to the side) in order to simulate the presence of other observers of the navigable image content, e.g., to simulate crowding while navigating the navigable image content. The navigable image content, in this example, may also be modified to simulate jostling by the crowd, e.g., by slightly shifting the current view in random or unexpected directions as would be expected from trying to navigate through a crowd. The experience may be further enhanced through the use of haptic devices that provide haptic feedback (e.g., vibrations) during playback to simulate jostling. In another example, constraints may be employed to simulate the experience of "preferred seating" that provides a better view while following a navigation of the navigable image content (e.g., a front row view). A follower, in this example, may thus be constrained to certain views during playback. Constraining followers to certain views thus provides the opportunity to offer premium views (e.g., for a fee) of the navigable image content. Additional and alternative scenarios and experiences will be appreciated with the benefit of this disclosure.

The navigation data may also be modified to simulate a particular type of observer. A user may be a first type of observer that initially navigates the navigable image content to generate the navigable image data. The coordinator apparatus 104 may subsequently modify the navigation data generated by the user in order to simulate different types of observers. In other words, the coordinator apparatus 104 may modify the navigation data such that navigation of the navigable image content during playback for a follower is presented as if a different type of observer initially performed the navigation. Examples of different types of observers include, for examples, human beings, animals, conveyances (e.g., trains, cars, boats, planes), and the like. Inverse kinematic techniques may be employed to fit the navigation data generated by the initial observer to a model (e.g., a virtual model) of another type of observer such that the variant navigation data 110 generated is consistent with that model. In one example, navigation data generated by a user may be fit to a model of a vehicle (e.g., a race car) to obtain variant navigation data that is consistent with that model of the vehicle. A subsequent navigation through the navigable image content with the variant navigation data, in this example, would thus appear as if the vehicle was the initial observer that generated the navigation data. Additional and alternative examples will be appreciated with the benefit of this disclosure. Techniques to enhance the experience (e.g., visual effects, audio effects) may also be employed during playback of the navigable image content for a follower. Such techniques will be discussed in further detail below.

Removing the navigation data 108 includes deleting or otherwise eliminating one or more values of the navigation data. For example, removing the navigation data 108 may include removing a set of coordinates, removing a set of rotation angles, or removing a set of dimensions. The coordinator apparatus 104 may be configured to remove navigation data 108 in order to obtain the variant navigation data 110 that similarly smoothes the transition between different orientations. The coordinator apparatus 104 may remove portions of the navigation data 108 to, e.g., reduce or eliminate noise from the navigation data, better fit the navigation data to an identified or a selected curve, and the like. The coordinator apparatus 104 may again be configured to employ various functions and/or algorithms suitable for smoothing the navigation data 108 by removing portions of the navigation data in order to generate the variant navigation data 110, e.g., filters such as low-pass filters. In another example, the navigation data may be fitted to a parametric curve (or similar path), and the individual points of the navigation data may be subsequently removed or otherwise disregarded. The parametric curve, in this example, may thus be utilized to generate new navigation data that fits to the curve. In a further example, it may be determined that the navigation data sufficiently follows a parametric interpolation. The parametric interpolation, in this example, may thus be subsequently performed as a substitute for the individual points of navigation data which may likewise be removed or otherwise disregarded.

Adding to the navigation data 108 includes inserting one or more values into the navigation data or appending one or more values to the navigation data. For example, adding to the navigation data may include inserting or appending one or more sets of coordinates, one or more sets of rotation angles, or one or more sets of dimensions. The navigation data inserted or appended may be existing navigation data extracted from the navigation data 108 received or new navigation data derived from the navigation data received. For example, to extend the duration between transitions of the leader's orientation, the coordinator apparatus may repeat instances of the navigation data 108 to obtain the variant navigation data 110. In this example, the coordinator apparatus 104 may duplicate every $n^{th}$ instance of the navigation data 108 received to obtain the variant navigation data 110. In one particular example, the coordinator apparatus 104 may duplicate every other (i.e., $2^{nd}$) instance of the navigation data 108 received which would double the duration between changes in the orientation of the view at the follower viewing apparatus 106. This technique of duplicating instances of the navigation data 108 received may be selectively employed to extend the duration between orientation changes by additional and alternative amounts, e.g., duplicating every $4^{th}$ instance of navigation data to extend the duration of orientation changes by 25%, every $5^{th}$ instance of navigation data to extend the duration of orientation changes by 20%, extend every $10^{th}$ instance of navigation data to extend the duration of orientation changes by 10%, and so forth. In addition, instances of navigation content (e.g., every $n^{th}$ instance) may be duplicated multiple times (e.g., twice, thrice, etc.) when obtaining the variant navigation data 110 in order to further extend changes between orientations of the view at the follower viewing apparatus. It should be recognized that the navigation data may be generated at regular intervals or intermittently. Accordingly, additional and alternative techniques for extending the duration of transitions between views of the navigable image content include duplicating or interpolating playback times and reference points.

Generating new navigation data based on the navigation data 108 includes translating the navigation data into new navigation data or deriving new navigation data from the navigation data received. Translating the navigation data 108 includes translating between different formats for the navigation data such that the navigation data received has a first format and the variant navigation data 110 obtained has a second format different from the first format. For example, the navigation data 108 may be received as a time-series of sets of coordinates (the first format), and the coordinator apparatus 104 may be configured to translate the navigation data received into a time-series of sets of rotation angles (the second format). In this example, the variant navigation data 110 obtained and provided to the follower viewing apparatus 106 may thus be formatted according to the second format, the time-series of sets of rotation angles. Additional and alternative examples will be appreciated with the benefit of this disclosure for translating between various formats suitable for indicating the orientations of a viewer's view of the navigable image content, e.g., for translating between coordinates, rotation angles, and dimensions or for translating between explicit values that indicate the orientations and difference values that indicates the relative changes between successive instances of navigation data as described above. Translating the navigation data 108 also includes converting between different file types respectively utilized by the leader viewing apparatus 102 and the follower viewing apparatus 110. The coordinator apparatus 104 may thus possess or otherwise obtain information indicating one or more file types the leader viewing apparatus 102 and the follower viewing apparatus 106 are each capable of handling and convert between those file types when obtaining the variant navigation data 110 from the navigation data 108 received.

The coordinator apparatus 104 may also derive new navigation data in various ways and for various reasons. For example, the coordinator apparatus 104 may derive new navigation data also in order to smooth the transitions between changes in the orientation of the leader's view of the navigable image content. One particular technique may involve interpolating between a starting orientation and an ending orientation. In this technique, the coordinator apparatus 104 may identify a starting orientation and an ending orientation in the navigation data 108 received. The coordinator apparatus may then perform an interpolation between the starting orientation and the ending orientation in which new navigation data is generated during the interpolation, e.g., new sets of coordinates, new sets of rotation angles, and new sets of dimensions. The coordinator apparatus 104 may employ one or more curve functions to perform the interpolation. Different types of curve functions may be employed, e.g., linear, quadratic, power, polynomial, rationale, exponential, logarithmic, sinusoidal, and the like. The curve function employed may be dynamically obtained by curve fitting the navigation data 108 received or may be a static curve function stored at the coordinator apparatus 104. In some implementations, the coordinator apparatus may store a curve library containing multiple curve functions that may be selectively employed to perform the interpolation. The curve library may include one or more easing functions used to control the rate of change between the starting orientation and the ending orientation. Examples of easing functions include linear functions, ease-in functions, ease-out functions, ease-in-out functions, elastic functions, and bounce functions. The coordinator apparatus 104 may be configured to identify a starting orientation and an ending orientation by detecting pauses in the navigation data 108 in which the orientation does not change for a threshold amount of time (e.g., half a second).

The coordinator apparatus 104 may also obtain metadata for the navigation data 108 and provide that metadata to the follower viewing apparatus 106 along with the navigation data. The coordinator apparatus 104 may generate the metadata and/or retrieve the metadata from storage. The metadata for the navigation data 108 may include, for example, annotations that indicate the navigation of the navigable image content at a particular point in time. Examples of annotations the coordinator apparatus 104 may derive include the velocity of a navigation event, the acceleration of a navigation event, and an indication of the field-of-view of the navigable image content which may be determined based on characteristics of the navigable image content, the velocity derived, and/or the acceleration derived. Examples of annotations the coordinator apparatus 104 may obtain also include effects (e.g., visual effects, sound effects, haptic effects) to apply to the navigable image content (or otherwise perform) during playback for the follower. For example, consider navigable image content depicting a race car from the perspective of the driver. Metadata for the navigation data, in this example, might include annotations indicating visual effects and/or audio effects that enhance the "race car" experience for the follower during playback of the navigable image content, e.g., an audio effect that causes the sound of tires squealing, a visual effect to present smoke within the field-of-view, and the like.

The coordinator apparatus 104 may be implemented in various ways. For example, the coordinator apparatus 104 may be located locally or remotely relative to the leader viewing apparatus 102 and/or the follower viewing apparatus 106. In this regard, the coordinator apparatus 104 may be located at the same premises as the leader viewing apparatus 102 or the follower viewing apparatus, at different premises than the leader viewing apparatus or the follower viewing apparatus, or at different premises than both the leader viewing apparatus and the follower viewing apparatus. Example embodiments thus include an embodiment in which each of the leader viewing apparatus 102, the follower viewing apparatus 106, and the coordinator apparatus 104 are located at the same premises; an embodiment in which the leader viewing apparatus and the coordinator apparatus are located at the same premises while the follower viewing apparatus is located at a different premises; an embodiment in which the follower viewing apparatus and the coordinator apparatus are located at the same premises while the leader viewing apparatus is located at a different premise; and an embodiment in which the leader viewing apparatus, the coordinator apparatus, and the follower viewing apparatus are each located at different premises. These example embodiments are illustrated in FIGS. 10A-D and discussed further below.

Figure 9:
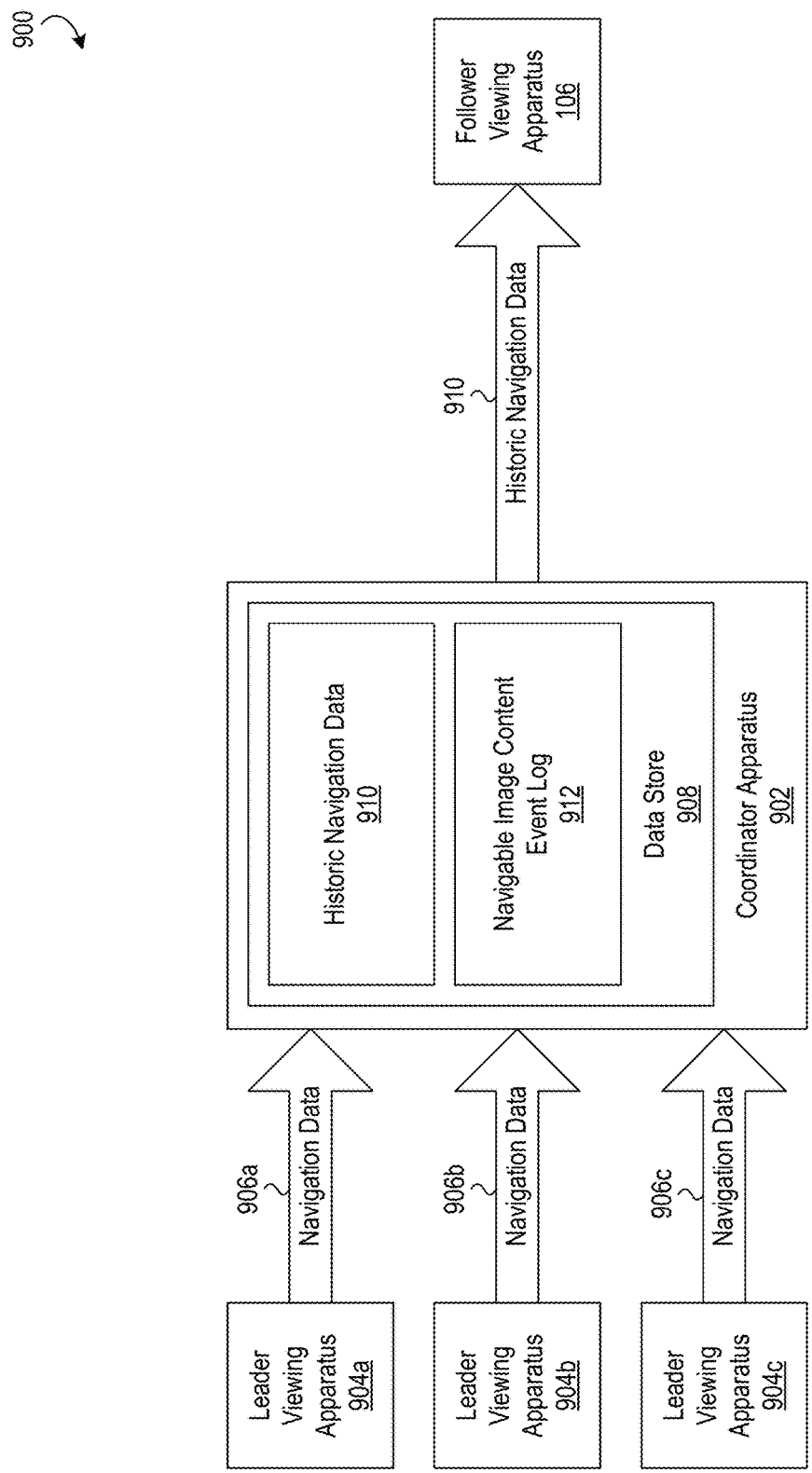
FIG. 9 depicts an example implementation of a guided collaborative viewing system.
Figure 10B:
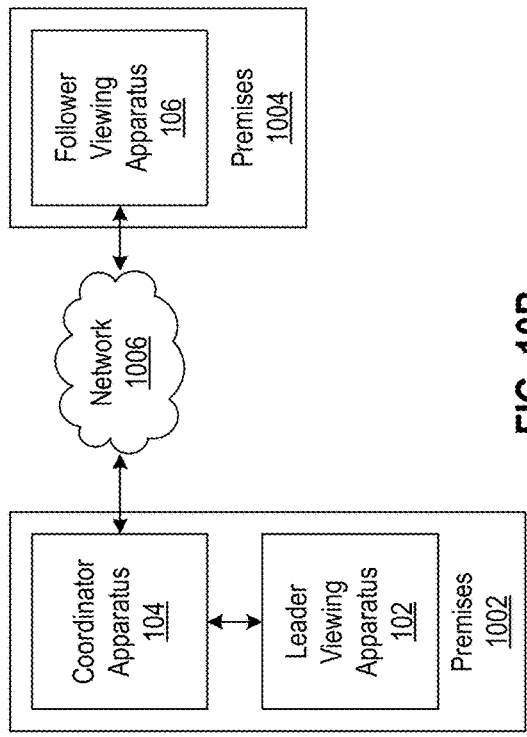
FIG. 10B depicts an example arrangement of the components of a guided collaborative viewing system.
Figure 10D:
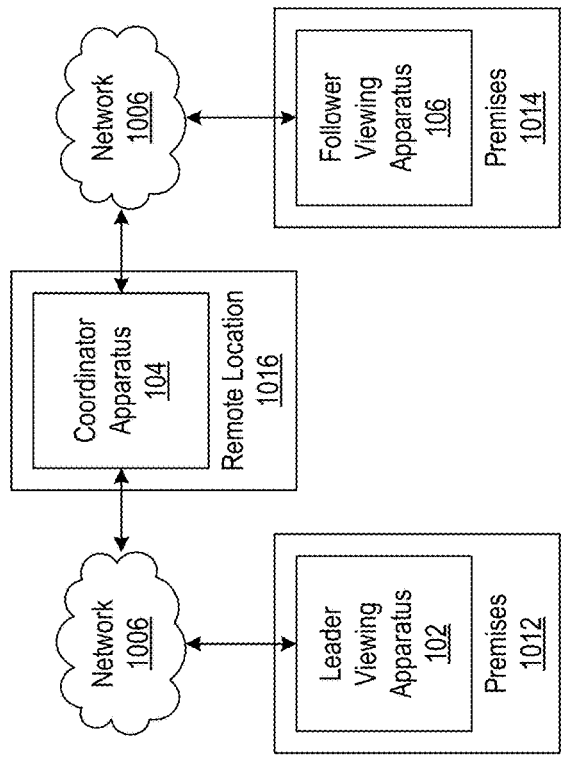
FIG. 10D depicts an example arrangement of the components of a guided collaborative viewing system.
Figure 10A:
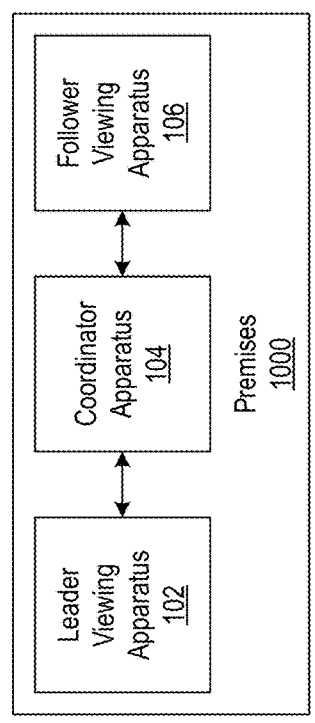
FIG. 10A depicts an example arrangement of the components of a guided collaborative viewing system.
Figure 10C:
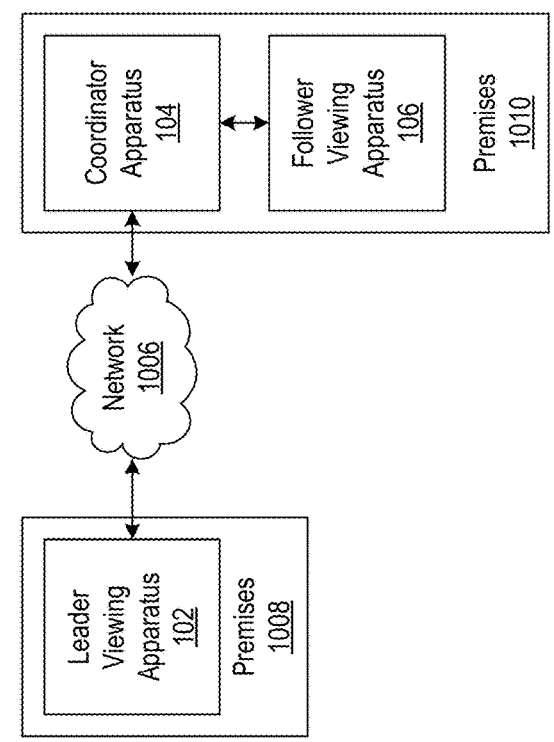
FIG. 10C depicts an example arrangement of the components of a guided collaborative viewing system.
Figure 11:
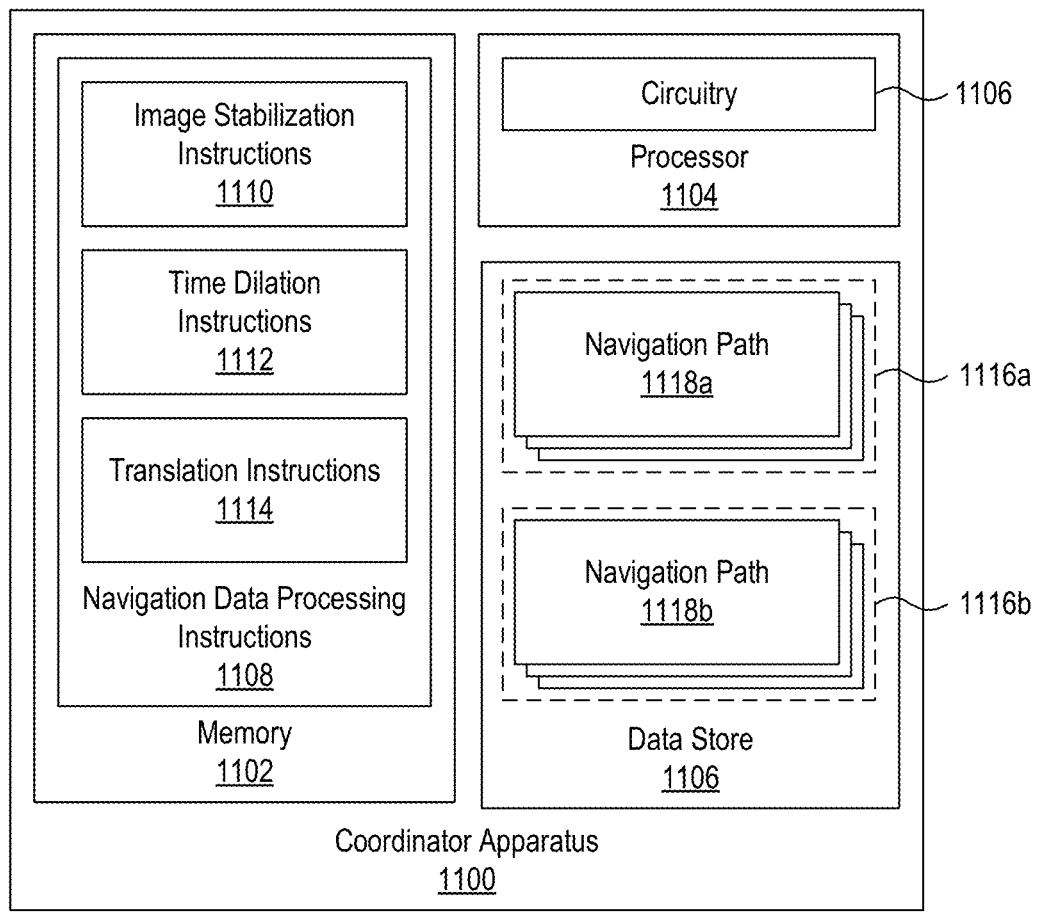
FIG. 11 depicts an example implementation of a coordinator apparatus.

The coordinator apparatus 104 may thus be implemented using different types of devices depending on its location relative to the leader viewing apparatus 102 and the follower viewing apparatus including, for example, a server, a router, a gateway, a set-top box, a video playback device (e.g., a television, computer monitor/screen), a video game console, a microconsole, a dongle, and other types of hardware devices and/or computing devices suitable for implementing the functionality of the coordinator apparatus described herein. In some example implementations, the coordinator apparatus 104 may be integrated into the leader viewing apparatus 102 or the follower viewing apparatus 106. Example embodiments of a coordinator apparatus are depicted in FIG. 9 and FIG. 11 and are discussed in further detail below. In addition, the coordinator apparatus 104 may be located locally or remotely relative to the leader viewing apparatus 102 and/or the follower viewing apparatus 106. Various example arrangements of the leader viewing apparatus 102, the coordinator apparatus 104, and the follower viewing apparatus 106 are depicted in FIGS. 10A-C and are likewise discussed in further detail below.

Referring now to FIGS. 2A-B, example implementations of viewing apparatuses are shown. In FIG. 2A, for example, an example implementation of a viewing apparatus 200 is shown. The example viewing apparatus 200 in FIG. 2A may be used as either a leader viewing apparatus or a follower viewing apparatus such as those described above with reference to FIG. 1. The viewing apparatus 200, in this example, includes a user input device 202, a display device 204, a network interface 206, and a content source device 208.

The user input device 202 may be any device capable of receiving input from a user that indicates a direction in which to navigate navigable image content, e.g., up, down, left, right, forward, backward, and combinations thereof. In this regard, examples of user input devices that may be employed for the user input device 202 include a keyboard, a mouse, a touchpad, a touchscreen, a trackball, a joystick, a stylus, a video game controller, an eye gaze tracker, and the like. The user input device 102 may also be implemented using kinetic input devices that receive input through the motion of the device itself or motion of the user, such motion being detected either visually or through motion sensors. The user input device 102 may also include audio input devices such as a microphone that receives audio commands (e.g., verbal commands) from the user for navigating the navigable image content. In some example implementations, the user input device 202 may be configured such that the user provides the input manually, i.e., using one or more fingers and/or a hand. In other example implementations, the user input device 202 may be configured such that the user provides the input by a turn of the head, e.g., where the user input device is integrated into a head-mounted display. As noted above, the user input device 202 may be integrated into the viewing apparatus 200 or, alternatively, a separate, individual component that is communicatively connected to the other components of the viewing apparatus, e.g. via wired or wireless connections.

The display device 204 may be any device capable of converting image data into a visual image. Examples of display devices that may be employed for the display device 204 include a television, a computer monitor, a computer screen, a touchscreen, a projector, a head-mounted display, a heads-up display, digital signage, and other types of electronic visual displays. The display device 204 may receive the image data to display from the content source device 208 and/or via the network interface 206. As noted above, the display device 204 may be integrated into the viewing apparatus 200 with the content source device 208 and/or the network interface 206 or, alternatively, may be a separate, individual component that is communicatively connected to the network interface 206 and/or the content source device 208, e.g. via wired or wireless connections.

The network interface 206 may be any device capable of communicating via a computer network. The network interface 206 may be configured for communicating on the network using one or more of wired communications or wireless communications using one or more communication protocols. Example communication protocols include, for example, Ethernet and Wi-Fi. Additional and alternative protocols suitable for exchanging communications on wired and/or wireless networks may be selectively employed. The navigable image content, the navigation data, and/or the variant navigation data may be received via the network interface 206. Additionally or alternatively, the content source device 208 may provide the navigable image content to the display device 204 for presentation to the user.

The content source device 208 may be any device capable of providing the navigable image data to the display device 204. The content source device 208 may store the navigable image data and retrieve the navigable image data from storage during playback. In this regard, examples of content source devices that may be used to implement the content source device 208 include a digital video recorder, a hard disk drive, a solid state drive, a flash drive, a memory card, an optical disc player (e.g., digital video discs (DVDs), read-only memory compact discs (CD-ROMs), video discs, Blu-ray discs, etc.), and other types of mass storage devices suitable for storing navigable image data. The content source device 208 may also generate the navigable image data, e.g., for real-time (or near real-time) playback. In this regard, other examples of content source devices that may be used to implement the content source device 208 include a video game console that renders and outputs the navigable image data, video cameras that capture video images and output image data corresponding to the video images, and other types of devices capable of generating and outputting navigable image data. Such video cameras may include, for example, panoramic video cameras configured to capture wide-angle views (e.g., 180° degree views), omnidirectional cameras configured to capture up to a 360° field of view, and camera arrays having multiple cameras that each provide video images from respective angles which are subsequently stitched together to provide the navigable image data. Additional and alternative types of content source devices will be appreciated with the benefit of this disclosure.

In FIG. 2B, an example implementation of a viewing apparatus 210 is shown. The viewing apparatus 210 is similar to the viewing apparatus 200 of FIG. 2A in that it likewise includes a user input device 202, a display device 204, and network interface 206. The viewing apparatus 210 differs from the viewing apparatus 200 of FIG. 2A in that it does not include a content source device. Rather, the viewing apparatus 210 of FIG. 2B receives the navigable image content and the variant navigation data via the network interface 206. The navigable image content may be delivered to the viewing apparatus 210 via, e.g., a wide area network (WAN) (e.g., the Internet, a cellular network), a local area network (LAN), and/or a content delivery network. Content delivery networks will be discussed in further detail below with reference to FIG. 17.

Referring now to FIGS. 3-9, example implementations of guided collaborative viewing systems are shown. These example implementations illustrate the various ways in which the leader viewing apparatus, the coordinator apparatus, and the follower viewing apparatus may interact for guided collaborative viewing. As described in further detail below, for example, providing the navigation data and the variant navigation data to the follower viewing apparatus may be achieved in various ways. As also described in further detail below, providing the navigable image content to the leader viewing apparatus and the follower viewing apparatus may be achieved in various ways.

As shown for example, in FIG. 3, a first example implementation of a guided collaborative viewing system 300 is shown. In this example, a content source 302 provides the navigable image content 304 to each of the leader viewing apparatus 102 and the follower viewing apparatus 106. The leader viewing apparatus 108 provides the navigation data 108 to the coordinator apparatus 104 which, in turn, provides the variant navigation data 110 to the follower viewing apparatus as described above. In the guided collaborative system 300 shown by way of example in FIG. 3, the content source 302 may be located locally or remotely relative to the leader viewing apparatus 102 and/or the follower viewing apparatus 104. The guided collaborative viewing system 300 may thus correspond to an implementation in which the content source 302 is implemented as a video game console, the navigable image content 304 includes video game content, and the content source is directly connected (e.g., wired or wirelessly) to each of the leader viewing apparatus 108 and the follower viewing apparatus 106. The guided collaborative viewing system 300 may also correspond to an implementation in which the content source 302 is a content server on a content delivery network that provides the navigable image content 304 via the content delivery network to each of the leader viewing apparatus 102 and the following viewing apparatus 104 that are implemented as set-top boxes. Additional and alternative implementations will be appreciated with the benefit of this disclosure.

In FIG. 4, an example implementation of a guided collaborative viewing system 400 is shown. In this example, the leader viewing apparatus 102 itself provides the navigable image content 304 to the follower viewing apparatus. The leader viewing apparatus 102 also provides the navigation data 108 to the coordinator apparatus 104 which, in turn, provides the variant navigation data 110 to the follower viewing apparatus 106 as described above. The leader viewing apparatus 102 in FIG. 4 may be located remotely or locally relative to the follower viewing apparatus 104. The guided collaborative viewing system 400 shown by way of example in FIG. 4 may thus correspond to an implementation in which the leader viewing apparatus 102 includes an omnidirectional camera that captures a 360° field-of-view at the leader's location, and the navigable image content 304 includes image data corresponding to the 360° video captured by the omnidirectional camera. The guided collaborative viewing system 400 may also correspond to an implementation in which the navigable image content 304 is stored at a storage device of the leader viewing apparatus 102, retrieved from the storage device for playback and navigation by the leader, and provided to the follower viewing apparatus 106 (e.g., directly or via a network) for playback to the follower. Additional and alternative implementations will be appreciated with the benefit of this disclosure.

In FIG. 5, an example implementation of a guided collaborative viewing system 500 is shown. In this example, the leader viewing apparatus 102 provides the navigation data 108 to the coordinator apparatus 104. In turn, the coordinator apparatus 104, in this example, provides the navigation data 108 as well as the variant navigation data 110 to the follower viewing apparatus. Both the navigation data 108 and the variant navigation data 110 may be provided to the follower viewing apparatus 106 in order to allow the user at the follower viewing apparatus to select which type of navigation data to use during playback of navigable image content. The feature of switching between the navigation data 108 and the variant navigation data 110 will be discussed in further detail below. The guided collaborative viewing system 500 shown by way of example in FIG. 5 may correspond to an implementation in which the coordinator apparatus 104 is implemented as a server that receives the navigation data 108 from the leader viewing apparatus 108 via the Internet and delivers the navigation data and variant navigation data 110 to the follower viewing apparatus 106 also via the network Internet. The guided collaborative viewing system 500 shown by way of example in FIG. 5 may also correspond to an implementation in which the leader viewing apparatus 102 includes a head-mounted display that is directly connected (e.g., wired or wirelessly) to the coordinator apparatus 104, implemented as a microconsole, which is, in turn, directly connected to the follower viewing apparatus 106 that includes a television display. Additional and alternative implementations will be appreciated with the benefit of this disclosure.

In FIG. 6, an example implementation of a guided collaborative viewing system 600 is shown. In this example, the leader viewing apparatus 102 provides the navigation data 108 to both the coordinator apparatus 104 and the follower apparatus 106. Again, the leader viewing apparatus 102 in FIG. 6 may be located remotely or locally relative to the follower viewing apparatus 106. Similar to the implementation described above in FIG. 5, the follower viewing apparatus 106 in FIG. 6 may receive both the navigation data 108 and the variant navigation data 110 to allow the follower to select and switch between following the leader's navigation of the navigable image content according to the raw navigation data 108 generated by the leader viewing apparatus 102 or according to the variant navigation data 110 generated by the coordinator apparatus 104.

In FIG. 7, an example implementation of a guided collaborative viewing system 700 is shown. In this example, the coordinator viewing apparatus 104 receives the navigation data 108 from the leader viewing apparatus 102 as described above and then renders video content using the navigable image content navigated by the leader using the navigation data received. The coordinator apparatus 104 then provides rendered video content 702 to the follower display device 704 for playback to the follower. As one example, the leader may navigate immersive content (e.g., 3D video) at the leader viewing apparatus 102 to generate the navigation data 108. The coordinator apparatus 104 may receive the immersive content and render 2D video content from that immersive content according to the navigation data 108 received from the leader viewing apparatus 102. The coordinator apparatus 104 may then transmit the 2D video content to the follower display device 704 (e.g., a television) for playback. The coordinator apparatus 104 may be configured to generate the rendered video content 702 in real-time (or near real-time) as it receives the navigation data 108 from the leader viewing apparatus 102. Additionally or alternatively, the coordinator apparatus 104 may receive and store the navigation data 108 for subsequent generation of the rendered video content 702. The coordinator apparatus 104 may be configured to employ various video encoding and video compression techniques and/or standards to generate the rendered video content 702. Example video encoding and compression techniques and/or standards will be appreciated by those skilled in the art, e.g., H.264, H.265/HVEC, and the like. The coordinator apparatus 104 may transmit the rendered video content 702 in various ways including, for example, by broadcasting, by streaming, by delivering on-demand, and the like. In addition, the coordinator device 104 may generate multiple versions of the rendered video content 702. For example, the coordinator apparatus 104 may generate from the navigable image content rendered video content that includes "high" bitrate video content, "medium" bitrate video content, and "low" bitrate video content. The "high" bitrate video content may have a relatively high-resolution, the "low" bitrate video content may have a relatively low resolution, and the "medium" bitrate video content may have a resolution somewhere between the resolution of the "high" and "low" bitrate video content. In this example, adaptive bitrate streaming techniques may be utilized to transmit the rendered video content 702 to the follower display device 704 according to the bandwidth available on the network and/or the playback capabilities of the follower display device.

Figure 8:
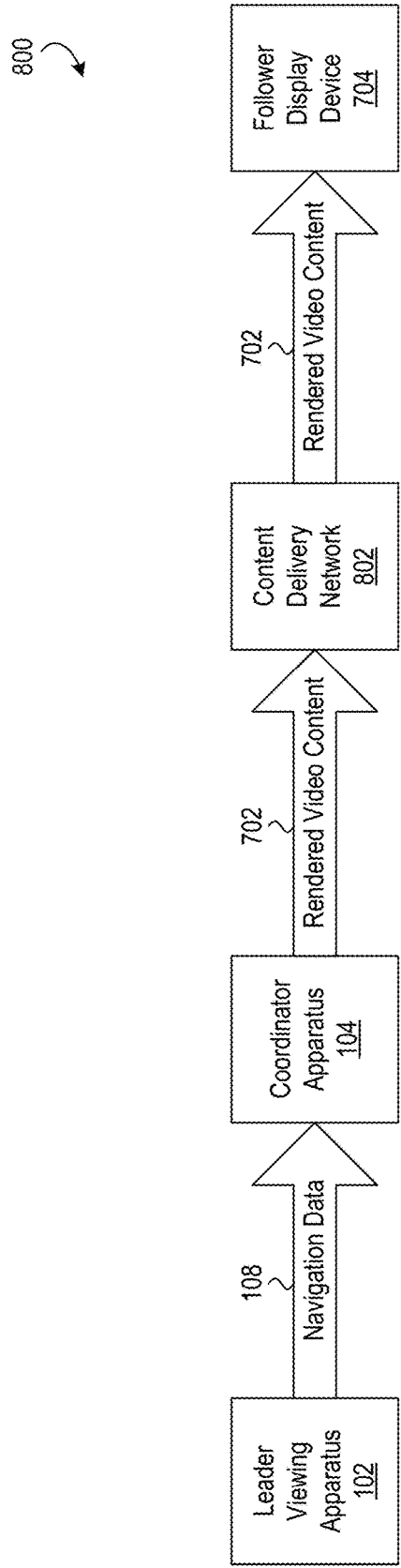
FIG. 8 depicts an example implementation of a guided collaborative viewing system.

In FIG. 8, an example implementation of a guided collaborative viewing system 800 is shown. The guided collaborative viewing system 800 in FIG. 8 is similar to the guided collaborative system 700 described above with reference to FIG. 7. For example, the leader viewing apparatus 102 in FIG. 8 likewise provides navigation data 108 to the coordinator apparatus 104 which generates rendered video content 702 from navigable image data according to the navigating data received. In contrast to the guided video collaborative viewing system 700, however, the coordinator apparatus 104 of the guided collaborative video system 800 provides the rendered video content 702 to a content delivery network 802 which, in turn, provides the rendered video content to the follower display device 704. The content delivery network 802 may store (e.g., in a content server) the rendered video content 702 received from the coordinator apparatus 104 for subsequent delivery to one or more follower display devices such as follower display device 704. The content delivery network 802 may also receive rendered video content 702 respectively generated by one or more coordinator apparatuses based on navigation data respectively received from one or more leader viewing apparatuses. The content delivery network 802 may also store with the rendered video content 702 metadata indicating, e.g., the navigable image data the rendered video content was derived from; the leader that provided navigation data used to generate the rendered video content; the date and/or time the leader navigated the navigable image content and/or the coordinator apparatus generated the rendered video content; a title, duration, description, and/or popularity for the rendered video content; a number of times the rendered video content has been viewed by other followers; and the like.

In FIG. 9, an example implementation of a guided collaborative viewing system 900 is shown. In this example, a coordinator apparatus 902 is communicatively connected to multiple leader viewing apparatuses 904a-c and respectively receives navigation data 906a-c from those viewing apparatuses. The coordinator apparatus 902 may be the same as (or at least similar to) the coordinator apparatus 104 discussed above with reference to FIG. 1. Similarly, the leader viewing apparatuses 904a-c may be the same as (or at least similar to) the leader viewing apparatus 102 discussed above with reference to FIG. 1. The coordinator apparatus 902, in this example, is also communicatively connected to a follower viewing apparatus 106 as described above.

In the guided collaborative viewing system 900 of FIG. 9, the coordinator apparatus 902 stores the navigation data 906a-c respectively received from the leader viewing apparatuses 904a-b. The coordinator apparatus 902, in this example, includes a data store 908 that stores the received navigation data 906a-c as historic navigation data 910. The data store 908 may store the historic navigation data 910 according to one or more of the techniques described herein. For example, the historic navigation data 910 may include metadata that identifies the leader that generated the navigation data, the navigable image content the leader navigated in order to generate the navigation data, a date/time the leader generated the navigation data, and the like. In this way, a follower at the follower viewing apparatus 106 may select to receive historic navigation data 910 associated with, e.g., a particular leader, particular navigable image content, a particular date and/or time, and the like.

The coordinator apparatus 902 may provide the historic navigation data 910 to the follower viewing apparatus 106 for use during playback of navigable image content. The coordinator apparatus 902 may provide some or all of the historic navigation data 910 to the follower viewing apparatus 106 also according to one or more of the techniques described herein. For example, the coordinator apparatus 902 may provide portions of the historic navigation data 910 on-demand in response to selections made by the follower at the follower viewing apparatus 106. User selections of navigation data will be discussed in further detail below with reference to FIGS. 12A-C. The historic navigation data 910 may, in some example implementations, include both the received navigation data 906a-c as well as the variant navigation data obtained by the coordinator apparatus 902. In other example implementations, the historic navigation data 910 may only include the navigation data 906a-c in its unprocessed and raw form, wherein the coordinator apparatus 901 only obtains corresponding variant navigation data after it has been retrieved from the data store 908, e.g., when responding to a request from the follower viewing apparatus 106. In further example implementations, the historic navigation data 910 may only include variant navigation data obtained by the coordinator apparatus 902 after receiving the respective navigation data 906a-c from the leader viewing apparatuses 904a-c. Additional and alternative examples will be appreciated with the benefit of this disclosure.

The coordinator apparatus 902, in this example, may simultaneously receive the navigation data 906a-c or receive the navigation data at different times. For example, the coordinator apparatus 902 may receive first navigation data 906a from the leader viewing apparatus 904a at a first time, second navigation data 906b from the leader viewing apparatus 904b at a second time after the first time, and third navigation data 906c from the leader viewing apparatus 904c at a third time after the second time. Additional and alternative examples will be appreciated with the benefit of this disclosure. For the sake of convenience, each set of navigation data received from a leader viewing apparatus is referred to herein as a "navigation path" as it describes the "path" a leader takes while navigating navigable image content, e.g., the series of changing orientations and/or translations with respect to the navigable image content. By storing the received navigation data 906a-c as historic navigation data 910, the coordinator apparatus 902 may build a library of "navigation paths" for individual items of navigable image content. Followers may then select a desired "navigation path" from that library in order to recreate a leader's navigation of an item of navigable image content.

Although the coordinator apparatus 902 stores the historic navigation data 910 in FIG. 9, additional and alternative implementations are possible. For example, in one example implementation, the leader viewing apparatuses 904a-c may respectively send the navigation data 906a-c to a data repository (e.g., a data warehouse) for storage, the data repository being separate from a coordinator apparatus. In another example implementation, a coordinator apparatus may receive navigation data from a leader viewing apparatus, obtain corresponding variant navigation data, and then forward the navigation data received and the variant navigation data obtained to a data repository for storage. The coordinator apparatus, in this additional example, may then query the data repository as needed for desired navigation data and/or variant navigation data.

The coordinator apparatus 902, in this example, also stores information for correlating the historic navigation data 910 with events associated with the navigable image content. As seen in FIG. 9, the data store 908 of the coordinator apparatus 902 also stores a navigable image content event log 912. The navigable image content event log 912 may include a listing of one or more events associated with an item of navigable image content, each event listing indicating a time value, e.g., formatted as HH:MM:ss:mmm (where HH corresponds to hours, MM corresponds to minutes, ss corresponds to second, and mmm corresponds to milliseconds). The navigable image content event log 912 may include additional information for each event listing, e.g., a description of the event. An example format for the navigable image content event log 912 may be, for example, (event number, time, description). To provide a concrete example, the navigable image content may be a 3D video recording of a rollercoaster ride. A corresponding event log for the 3D video recording may thus include the following time-identified list of events: {(1, 00:00:00:000, "leave station"), (2, 00:00:10:500, "first hill"), (3, 00:00:30:500, "first drop"), (4, 00:00:35:250, "first loop"), . . . , (20, 00:03:30:750, "return to station")}. The coordinator apparatus 902 may utilize the time values in the navigable image content event log 912 to retrieve historic navigation data 910 at those same times. Since the navigation data may also include a time-series of orientations with respect to the navigable image content as described above, the coordinator apparatus 902 may query the data store 908 for navigation data having a time that is the same as (or within a predetermined time threshold) the time of an event in the navigable image content event log 912. It will thus be appreciated that individual items of navigable image content may have a corresponding navigable image content event log. It will thus also be appreciated that the navigable image content event log 912 may be utilized such that followers can experience the same event from the perspective of different leaders by querying the data store for the historic navigation data corresponding to the time of the event for the desired leader. To continue the example above of the 3D video recording of the rollercoaster ride, the historic navigation data may include navigation data generated by a first rider while recording the ride from the front car as well as navigation data generated by a second user while recording the ride from the back car. During playback of the 3D video recording, a follower may initially select to view the "first drop" event from the perspective of the first rider in the front car and then from the perspective of the second rider in the back car. The coordinator apparatus may read the event log associated with the 3D recording to identify the time of the "first drop" event and submit respective queries for the navigation data at (or around) the same time. Additional and alternative examples will be appreciated with the benefit of this disclosure. Like the historic navigation data 910, the navigable image content event log 912 may also be stored at additional and alternative locations, e.g., data repositories communicatively connected to the coordinator apparatus.

The navigable image content event log 912 may also be utilized to inform the follower of events during playback of the navigable image content. For example, as the user navigates the navigable image content, the events listed in the navigable image content event log 912 may be presented to the user, e.g., at the display device of the follower viewing apparatus. Notifications that navigation data associated with the event is available may also be presented to the user, e.g., as an overlay on the navigable image content being navigated by the follower. The follower may thus continue to navigate the navigable image content independently or select to view a leader's navigation during the event.

The navigable image content event log 912 may also be employed when obtaining the variant navigation data. For example, the coordinator apparatus 902 may be configured to employ one or more particular techniques to obtain variant navigation data associated with the events listed in the navigable image content event log 912. As a particular example, the coordinator apparatus 902 may be configured to employ an image stabilization technique to stabilize the navigation data as a whole while employing a time-dilation technique for each event listed in the corresponding event log, e.g., to slow down navigation of the navigable image content during playback of the events. A coordinator apparatus may similarly employ the navigable image content event log 912 when generating rendered content based on navigation data associated with navigable image content.

Similar techniques may be employed to log areas of interest that are associated with navigable image content. Areas of interest in an item of navigable image content may be stored, e.g., by indicating an orientation for viewing that area of interest and, if needed, a reference point. A user may be notified of areas of interest while navigating navigable image content, e.g., by displaying overlays on the navigable image content configured to direct the user to a particular orientation. Such notifications may include, for example, arrows (e.g., up/down/left/right) that direct the current view of the user to the area of interest, colored borders at the edge of the user's field-of-view that increase in intensity as the user's current view approaches the area of interest, and the like. Additional techniques to notify a user of areas of interest include inducing movement within the current view of the navigable image content in order to entice the user's gaze and a "shimmering" effect implemented as, e.g., looping glow patterns and/or shadow patterns. Areas of interest may be identified based on a user's navigation of the navigable image content. For example, if a user's current orientation is generally the same (e.g., does not change beyond a threshold amount) for a threshold period of time (e.g., 2-3 seconds), an area of interest (or a potential area of interest) may be identified based on that orientation. Areas of interest in an item of navigable image content may be identified from potential areas of interest by crowdsourcing navigation data generated by multiple users while navigating that item of navigable image content. For example, if a threshold number of users (e.g., 5-10) focus on the same region of the navigable image content, that region may be identified as an area of interest and stored in order to notify subsequent users of that area of interest during subsequent navigation of the navigable image content. Similar techniques may be employed to identify events of interest. Areas of interest may also be added to the navigable image content or otherwise identified by an editor during an editorial process. Areas of interest may also be added through an automated analysis of the navigable image content that correlates the navigable image content with a database of related content (e.g., a database of landmarks having corresponding latitude/longitude coordinates).

As noted above, a leader viewing apparatus, a coordinator apparatus, and a follower viewing apparatus may be located at the same or different premises. FIGS. 10A-D illustrate example arrangements of the leader viewing apparatus 102, the coordinator apparatus 104, and the follower viewing apparatus 106 at respective premises. It will be appreciated that the example arrangements illustrated in FIGS. 10A-D may correspond to the location of the leader viewing apparatus 102, the coordinator apparatus 104, and the follower viewing apparatus with respect to their respective locations in one or more buildings or one or more rooms.

In FIG. 10A, a first arrangement is illustrated in which the leader viewing apparatus 102, the coordinator viewing apparatus 104, and the follower viewing apparatus 106 are each located at the same premises 1000. As noted above, the premises 1000 may be the same building or the same room of a building. In FIG. 10B, a second arrangement is illustrated in which the leader apparatus 102 and the coordinator apparatus 104 are both located at a first premises 1002 while the follower viewing apparatus 106 is located at a second premises 1004. In FIG. 10B, the coordinator apparatus 104 and the follower viewing apparatus 106 are communicatively connected via a network 1006, e.g., a WAN such as the Internet, a LAN, and the like. In FIG. 10C, the leader viewing apparatus 102 is located at a first premises 1008 while the coordinator apparatus 104 and the follower viewing apparatus 106 are both located at a second premises 1010. In FIG. 10C, the leader viewing apparatus 102 and the coordinator apparatus 104 are communicatively connected via the network 1006. In FIG. 10D, the leader viewing apparatus 102 is located at a first premises 1012, the follower viewing apparatus 106 is located at a second premises 1014, and the coordinator apparatus 104 is located remotely relative to both the leader viewing apparatus and the follower viewing apparatus at a remote location 1016. In FIG. 10D, the coordinator apparatus is communicatively connected to both the leader viewing apparatus 102 and the follower viewing apparatus 106 via the network 1006.

Referring now to FIG. 11, an example implementation of a coordinator apparatus 1100 is shown. The coordinator apparatus 1100 may be similar to the coordinator apparatus 102 described above. The coordinator apparatus 1100, in this example, includes memory 1102 that stores instructions for obtaining variant navigation data, a processor 1104 having circuitry 1106 for executing the instructions, and a data store 1106 for storing the variant navigation data obtained. Since obtaining the variant navigation data includes processing the navigation data received from a leader viewing apparatus, for convenience, the instructions stored at the memory 1102 are referred to herein as navigation data processing instructions 1108. By way of example only, the navigation data processing instructions 1108 in FIG. 11 include image stabilization instructions 1110, time dilation instructions 1112, and translation instructions 1114. The coordinator apparatus 1100 may employ the image stabilization instructions to obtain variant navigation data that stabilizes navigation of navigable image content during playback as described above. For example, the image stabilization instructions 1110, when executed, may result in variant navigation data that eliminates (or reduces) any jitter or shakiness in the leader's navigation of the navigable image content. The coordinator apparatus 1100 may employ the time dilation instructions 1112 to control changes to the orientation during playback of the navigable image content as described above. For example, the time dilation instructions may reduce the speed at which rotations of the leader's view occur for the follower. The coordinator apparatus 1100 may employ the translation instructions 1114 to translate navigation data received and/or variant navigation data obtained into navigation data and/or variant navigation data that a follower viewing apparatus is capable of consuming. The translation instructions 1114 may be configured to translate between formats used to indicate the time-series of orientations generated while navigating the navigable image content (e.g., coordinates and rotation angles) as well as the file types used to encode the time-series of orientations. The various instructions of the navigation data processing instructions 1108 is provided by way of example only and are by no means exhaustive. The navigation data processing instructions 1108 may include additional and alternative types of instructions which will be appreciated with the benefit of this disclosure. In addition, the memory 1102 of the coordinator apparatus 1100 may include additional and alternative types of instructions that will be appreciated with the benefit of this disclosure, e.g., instructions for formatting navigation data and variant navigation data for storage, instructions for rendering image content based on navigable image content and navigation data generated while navigating such content, instructions for identifying areas of interest based on users' navigation of navigable image content, instructions for identifying events and/or areas of interest, instructions for responding to follower requests for navigation data associated with a particular item of navigable image content and/or a particular leader, instructions for identifying the popularity of particular navigations, and the like.

The data store 1106 of the coordinator apparatus 1100, in this example, stores navigation data and variant navigation data as a "navigation path" as described above. As also described above, a "navigation path" may be stored such that it is associated with a particular item of navigable image content and with a particular leader. A leader may navigate and provide navigation data for multiple items of navigable image content resulting in multiple "navigation paths" generated by that leader. Multiple leaders may respectively navigate and provide respective navigation content for the same item of navigable image content also resulting in multiple "navigation paths" generated for that item of navigable image content. A leader may also navigate the same item of navigable image content multiple times resulting in multiple "navigation paths" for the same item of navigable image content generated by the same leader. A leader may thus be associated with a collection of multiple "navigation paths." An item of navigable image content may likewise be associated with a collection of multiple "navigation paths." In this regard, the data store 1106 of the coordinator apparatus 1100 is shown as storing a first collection 1116a of "navigation paths" 1118a and a second collection 1116b of "navigation paths" 1118b. As set forth above, the first collection 1116a of "navigation paths" 1118a may include "navigation paths" for a first item of navigable image content, each "navigation path" 1118a having been generated by a different leader, while the second collection 1116b of "navigation paths" 1118b may include "navigation paths" for a second item of navigable image content, each "navigation path" 1118b likewise having been generated by a different leader. Alternatively, the "navigation paths" 1118a of the first collection 1116a of "navigation paths" may have each been generated by a first leader for respective items of navigable image content, while the "navigation paths" 1118b of the second collection 1116b of "navigation paths" may have each been generated by a second leader for respective items of navigable image content.

As noted above, a follower may be presented with and select from a list of available leaders and/or "navigation paths" to follow. FIGS. 12A-C illustrate example implementations of interfaces that may be presented at a follower viewing apparatus for selecting a desired leader or a desired "navigation path" to follow.

In FIG. 12A, a first example implementation of an interface 1200 that may be presented at a follower viewing apparatus is shown. The interface 1200, in this example, includes an area used to display the current view of the navigable image content which, for convenience, is referred to herein as the navigable image content display 1202. The interface 1200 also includes a set of input elements 1204a-c configured to receive user input that selects a desired leader to follow. For example, the user may select input element 1204a to follow the view of a first leader, may select input element 1204b to follow the view of a second leader, and may select input element 1204c to follow the view of a third leader. The input elements 1204a-c may be implemented using any type of controller for receiving a user selection including, e.g., a button, context menu, drop down list, menu bar, pie menu, checkbox, combo box, list box, radio button, and the like. A user may additionally or alternatively select a desired leader to follow via key mappings to particular leaders (e.g., key #1 to leader #1, key #2 to leader #2, etc.). Key selections may be made via a physical or virtual keyboard. A user may additionally or alternatively select a desired leader to follow via voice input, e.g., by speaking a number, name, or other unique identifier associated with the desired leader.

The list of leaders available to follow may be determined based on the navigable image content being presented at the follower viewing apparatus. For example, the user may select navigable image content to navigate, and in response to that selection the follower viewing apparatus may submit a request to the coordinator apparatus for other users that are currently navigating or have previously navigated the navigable image content. In response to receipt of the request, the coordinator apparatus may provide the follower viewing apparatus with a list of other users that are navigating or have navigated the navigable image content. The follower viewing apparatus may then present the list of those users, one of which the user may select as a leader to follow with respect to the navigable image content being presented at the follower viewing apparatus. In response to a selection of a leader to follow, the follower viewing apparatus may submit a request to the coordinator apparatus for the navigation data generated by the selected leader for the navigable image content. In response to receipt of that request, the coordinator apparatus may retrieve the corresponding navigation data (e.g., the original navigation data and/or the variant navigation data) and provide the retrieved navigation data to the follower viewing apparatus which may navigate the navigable image content according to the navigation data received.

In FIG. 12B, an example implementation of an interface 1206 that may be presented at a follower viewing apparatus is shown. The interface 1206, in this example, likewise includes a navigable image content display 1202 for presenting the current view of the navigable image content. In contrast to the interface 1200 of FIG. 12A, the interface 1206 of FIG. 12B includes input elements 1208a-c configured to receive user input that selects a desired "navigation path" to follow. For example, the user may select input element 1208a to follow a first navigation of the navigable image content, may select input element 1208b to follow a second navigation of the navigable image content, and may select input element 1208c to follow a third navigation of the navigable image content. The "navigation paths" available for selection may correspond to previous navigations of the navigable image content by one or more users, including previous navigations by other users as well as previous navigations by the current user. The input elements 1208a-c may be implemented using any of the control techniques described above with reference to input elements 1204a-c. Key selections and voice input may likewise be used to select a desired "navigation path" to follow.

The list of "navigation paths" available for selection may likewise be determined based on the navigable image content being presented at the follower viewing apparatus. For example, the user may select navigable image content to navigate, and in response to that selection, the follower viewing apparatus may submit a request to the coordinator apparatus for "navigation paths" that are associated with the navigable image content. In response to receipt of the request, the coordinator apparatus may provide the follower viewing apparatus with a list of "navigation paths" that have been generated for the navigable image content. The follower viewing apparatus may then present the list of those "navigation paths," one of which the user may select to follow with respect to the navigable image content being presented at the follower viewing apparatus. In response to a selection of a "navigation path" to follow, the follower viewing apparatus may submit a request to the coordinator apparatus for the navigation data corresponding to the selected "navigation path". In response to receipt of that request, the coordinator apparatus may retrieve the corresponding navigation data (e.g., the original navigation data and/or the variant navigation data) and provide the retrieved navigation data to the follower viewing apparatus which may then navigate the navigable image content according to the navigation data received.

In FIG. 12C, an example implementation of an interface 1210 that may be presented at a follower viewing apparatus is shown. The interface 1210, in this example, again likewise includes a navigable image content display 1202 for presenting the current view of the navigable image content. In addition, the interface 1210, in this example, includes interface elements 1212 and 1214 for switching between two types of navigation data associated with the navigable image content currently being presented, in particular the original navigation data and the variant navigation data. The views of the navigable image content resulting from the original (e.g., unmodified) navigation data may be referred to as the "raw view." The views of the navigable image content resulting from the variant (e.g., modified) navigation data may be referred to as the "modified view." In this example, a user at a follower viewing apparatus may select input element 1212 to follow the "raw view" of a leader and may select input element 1214 to follow the "modified view" of the leader. In this way, the user may selectively switch between following the "raw view" and the "modified view," e.g., if the user finds the "raw view" of the leader to be uncomfortable or disorienting. The input elements 1212 and 1214 may be implemented using any of the control techniques described above, via key selections, and via voice input.

The user may switch between the "raw view" and the "modified view" after having selected navigable image content to navigate and a leader or "navigation path" to follow. For example, after the user has selected the navigable image content and a leader or "navigation path," the user may select to follow either the "raw view" or the "modified view." In example implementations, either the "raw view" or the "modified view" may be presented as the default view. A user may also specify which view is to be used as the default view, e.g., as a user setting at the follower viewing apparatus. In response to receipt of user input at one of the input elements 1212 or 1214, the follower viewing apparatus may initiate navigation of the navigable image content according to the original navigation data or the variant navigation data. In some example implementations, the coordinator apparatus may provide both the original navigation data and the variant navigation data to the follow viewing apparatus. In other example implementations, the coordinator apparatus may not provide the original navigation data or the variant navigation data until the follow viewing apparatus submits a request, e.g., in response to input received at one of the input elements 1212 or 1214. Providing both the original navigation data and the variant navigation data may advantageously facilitate a quick transition between the "raw view" and the "modified view" and avoid potential delays in response times associated with requesting and receiving the navigation data.

The interfaces 1200, 1206, and 1210 are illustrated in FIGS. 12A-C and described herein by way of example only. Particular implementations of interfaces at a follower viewing apparatus may include additional and alternative user interface elements. In addition, a follower viewing apparatus may present one or more of the interfaces 1200, 1206, or 1210 throughout a playback session of navigable image content based on the user input received during that session. For example, a follower viewing apparatus may first present an interface that indicates multiple items of navigable image content that are available to navigate at the follower viewing apparatus. The user may select one of the items of navigable image content, and the follower viewing apparatus may then present an interface (e.g., interface 1200) that indicates multiple leaders to follow and/or an interface (e.g., interface 1206) that indicates multiple "navigation paths" to follow with respect to the selected item of navigable image content. During playback of the selected item of navigable image content using received navigation data, the follower viewing apparatus may present an interface (e.g., interface 1210) that allows the user to switch between the "raw view" or the "modified view." Additional and alternative examples will be appreciated with the benefit of this disclosure.

The follower viewing apparatus may also be configured to switch between following a leader and independent control of the current view of the navigable image content. Switching between following a leader's navigation and independent navigation may be achieved using any of the control techniques described herein, e.g., input elements presented at a user interface, key bindings, voice input, and the like.

The system for guided collaborative viewing may also include a social aspect. For example, users may create user profiles and link those profiles to the user profiles created by other users (e.g., friends). The follower viewing apparatus may thus present interfaces that indicate what items of navigable image content those other users are currently navigating or have navigated and select users and/or "navigation paths" to follow. A popularity feature may be employed, e.g., to identify popular items of navigable image content, popular leaders, popular "navigation paths," and the like. Popularity may be based on user rankings of the navigable image content, leaders, and/or "navigation paths," a number of views and/or followers, and the like.

Figure 13:
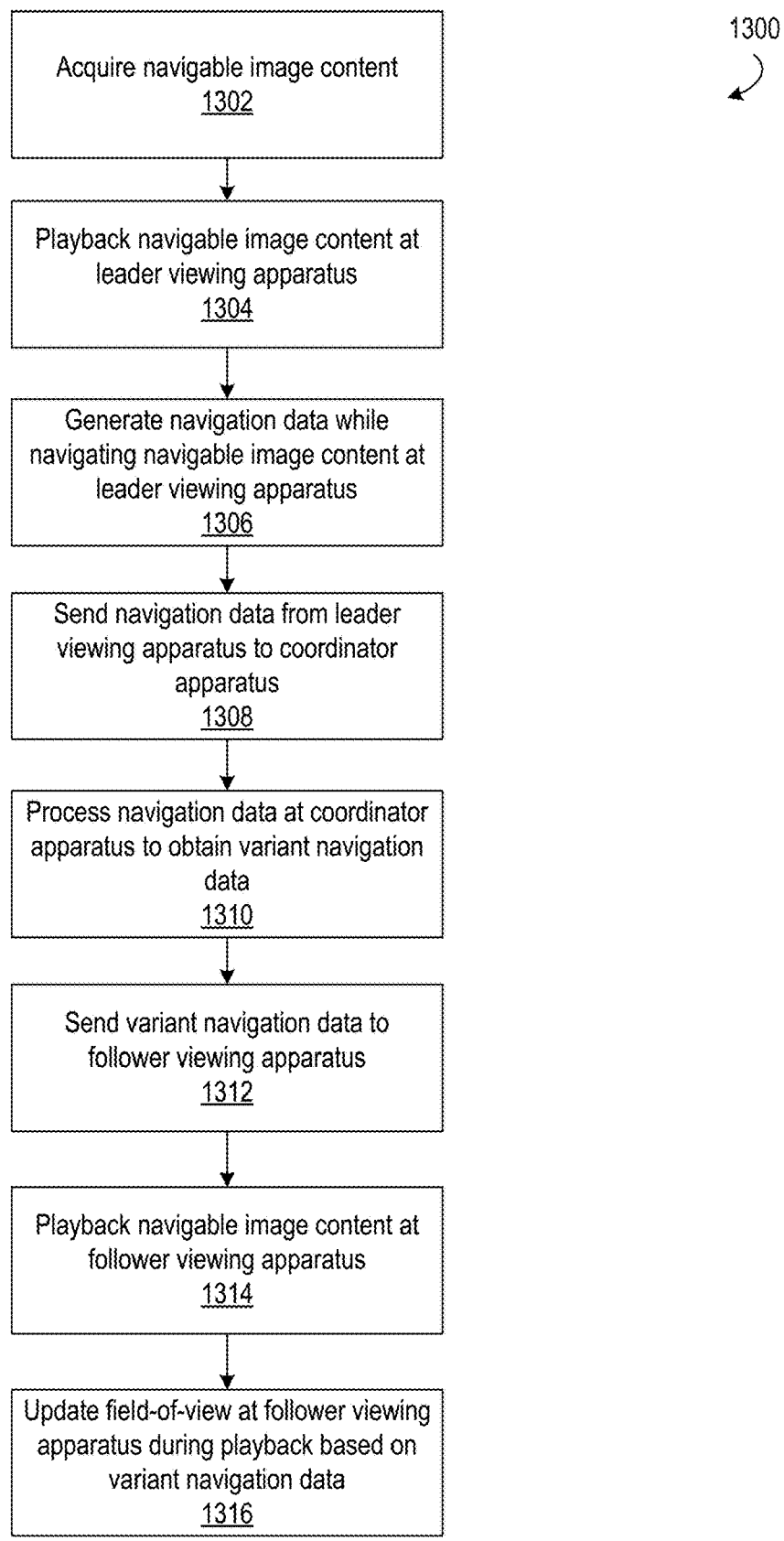
FIG. 13 depicts a flowchart of example method steps for providing guided collaborative viewing of navigable image content.

Referring now to FIG. 13, a flowchart 1300 of example method steps for providing guided collaborative viewing of navigable image content is shown. Navigable image content is acquired at step 1302, e.g., captured by an image capture device, rendered based on image data, or retrieved from storage. A leader viewing apparatus performs playback of the navigable image content at step 1304. During playback, a leader navigates the navigable image content thereby causing the leader viewing apparatus to generate navigation data at step 1306. The navigation data generated by the leader viewing apparatus may be in one of the various forms described above, e.g., coordinates, rotation angles, etc. The leader viewing apparatus then sends the navigation data generated to a coordinator apparatus at step 1308. The coordinator apparatus processes the navigation data received to obtain variant navigation data at step 1310. The coordinator apparatus obtains the variant navigation data using one or more of the techniques described above. The coordinator apparatus then sends the variant navigation data to a follower viewing apparatus at step 1312. The coordinator apparatus may also send the original navigation data generated by the leader viewing apparatus to the follower viewing apparatus. In addition, the coordinator apparatus may send the variant navigation data to the follower viewing apparatus in real-time (or near-real time), on-demand, and the like. The coordinator apparatus may also send the navigation data received and the variant navigation data obtained to a data store for storage. The follower viewing apparatus also performs playback of the navigable image content at step 1314. During playback, the follower viewing apparatus may update the field-of-view of the navigable image content at step 1316 based on the variant navigation data received.

Figure 14:
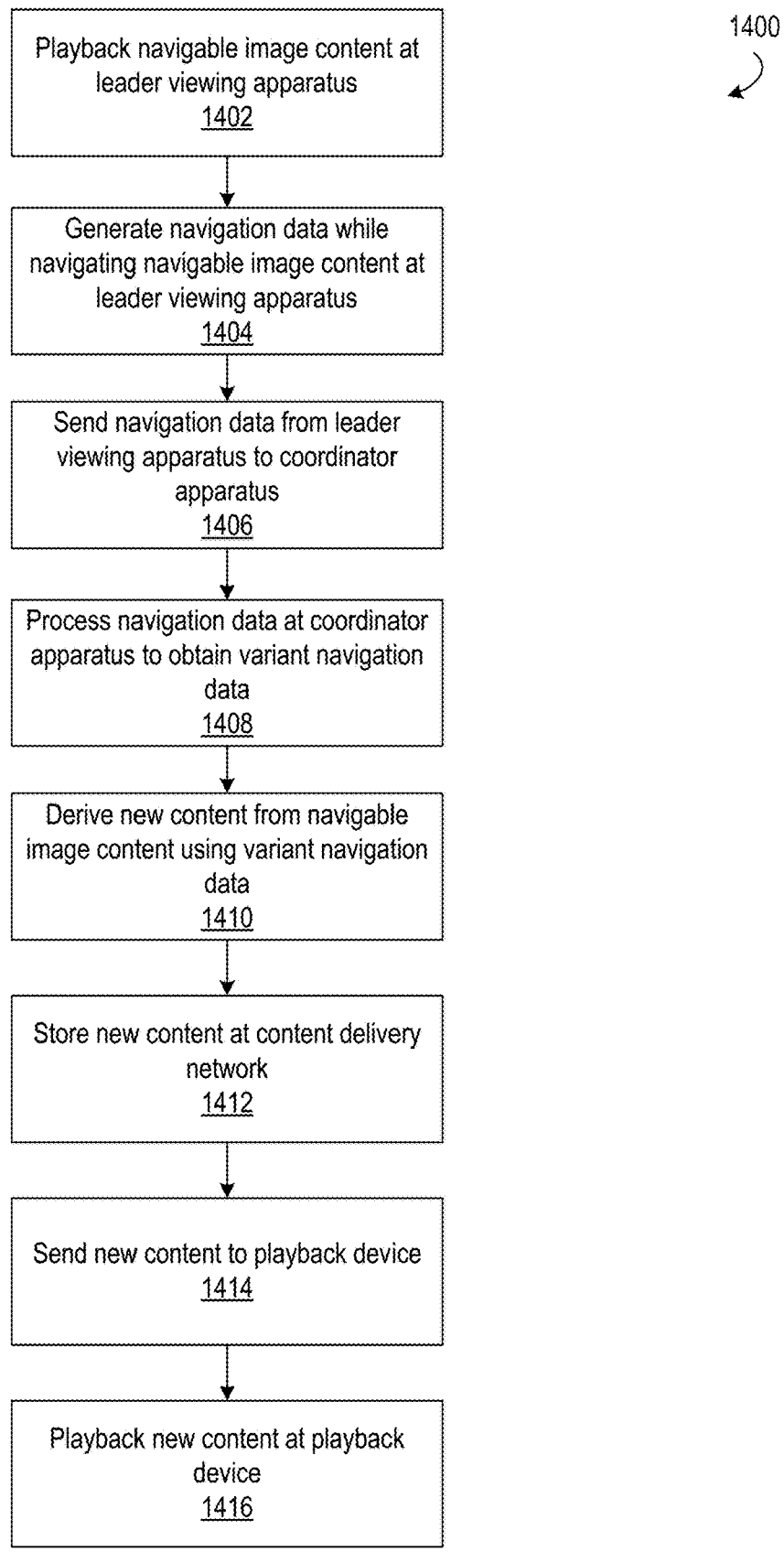
FIG. 14 depicts a flowchart of example method steps for providing guided collaborative viewing of navigable image content.

In FIG. 14, another flowchart 1400 of example method steps for providing guided collaborative viewing is shown. A leader viewing apparatus performs playback of the navigable image content at step 1402 as described above. During playback, a leader navigates the navigable image content thereby causing the leader viewing apparatus to generate navigation data at step 1404 as also described above. The leader viewing apparatus then sends the navigation data generated to the coordinator apparatus at step 1406 which processes the navigation data received to obtain variant navigation data at step 1408. The coordinator apparatus then derives new content from the navigable image content navigated by the leader at step 1410 using the variant navigation data obtained. The new content obtained may thus correspond to a "navigation path" taken by the leader while navigating the navigable image content. The new content may be non-navigable image content (e.g., new 2D video or new 3D video) suitable for playback but not navigation at the follower viewing apparatus. The new content may alternatively be navigable image content (e.g., new immersive content) suitable for both playback and navigation at the follower viewing apparatus. The coordinator apparatus provides the new content obtained to a content delivery network for storage at step 1412. The content delivery server may store the content at, for example, a content server that serves a playback device. The content delivery network then sends the new content to a playback device at step 1414. The playback device may be, for example, a set-top box installed at the premises of a user and connected to a television. The content delivery network may send the new content to the playback device at a scheduled time and/or on-demand. The playback device then performs playback of the new content received at step 1416.

Figure 15:
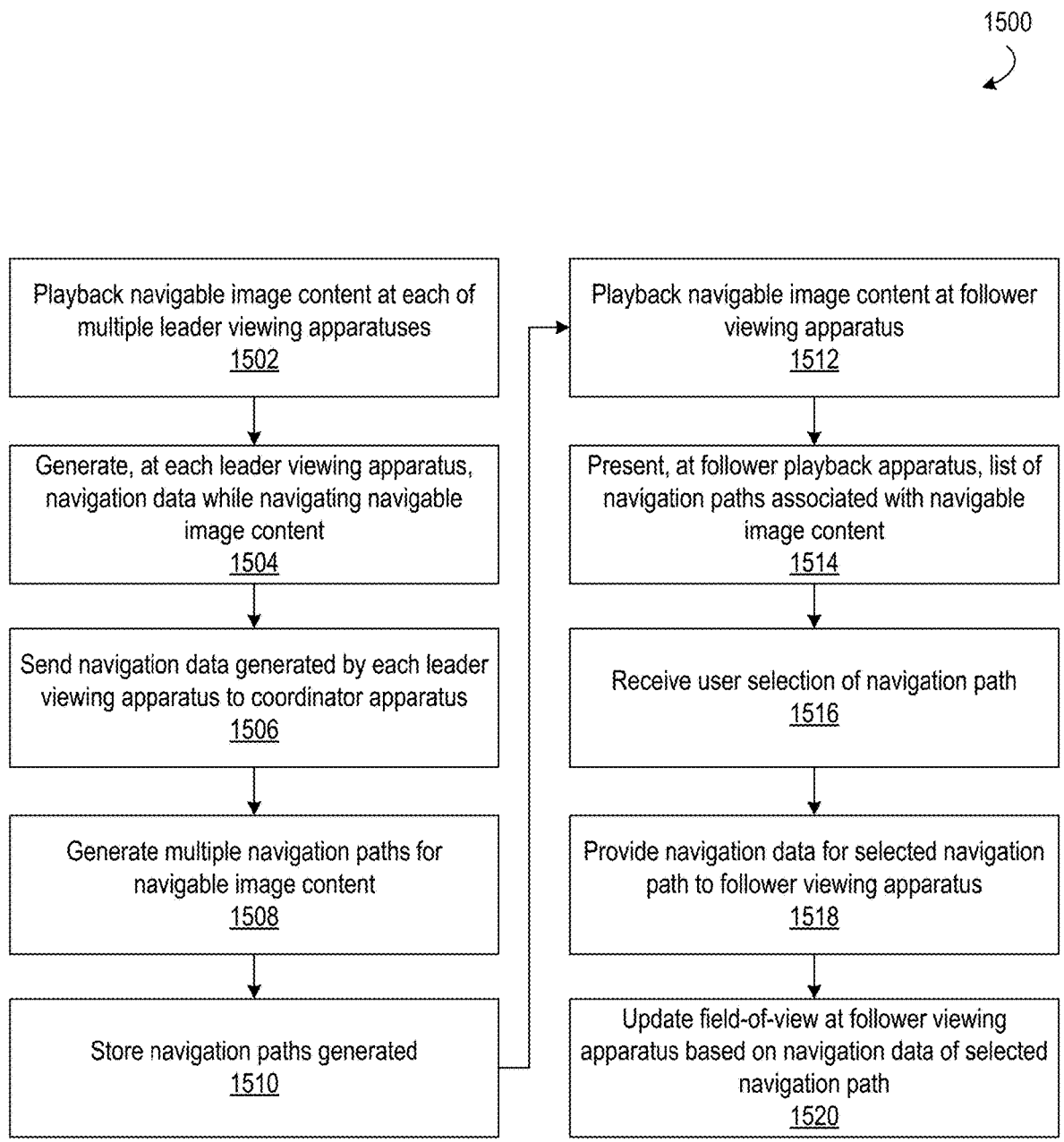
FIG. 15 depicts a flowchart of example method steps for providing guided collaborative viewing of navigable image content.

In FIG. 15, another flowchart 1500 of example method steps for providing guided collaborative viewing of navigable image content is shown. Multiple leader viewing apparatuses each perform playback of navigable image content at step 1502. In this example, the navigable image content is the same navigable image content, although an individual leader viewing apparatus may playback different versions (e.g., different formats, resolutions, etc.) of the navigable image content. The leader viewing apparatuses may playback the navigable image content simultaneously or at different times. During playback, each leader viewing apparatus generates navigation data at step 1504 as its respective leader navigates the navigable image content. The navigation data generated by each leader viewing apparatus is respectively sent to a coordinator apparatus at step 1506. The coordinator apparatus generates multiple "navigation paths" at step 1508 based on the navigation data received from the leader viewing apparatuses. The "navigation paths" generated may include "navigation paths" that correspond to the original navigation data received from the leader viewing apparatuses. The "navigation paths" generated may additionally or alternatively include "navigation paths" that correspond to variant navigation data the coordinator apparatus generates using the navigation data received from the leader viewing apparatuses. The coordinator apparatus then stores (e.g., locally or remotely) the "navigation paths" generated at step 1510. A follower viewing apparatus then performs playback of the navigable image content at step 1512. The follower viewing apparatus may perform playback of the navigable image content simultaneous with or subsequent to one or more of the leader viewing apparatuses. During playback, the follower viewing apparatus presents a list of the "navigation paths" associated with the navigable image content at step 1514. The follower viewing apparatus receives a user selection of one of the "navigation paths" at step 1516. The follower viewing apparatus may alternatively display the list of "navigation paths" available for selection and receive the user selection prior to beginning playback of the navigable image content. The coordinator apparatus provides the navigation data corresponding to the selected "navigation path" to the follower viewing apparatus at step 1518. The coordinator apparatus may provide the original navigation data received from the leader viewing apparatus and/or the variant navigation data obtained as described above. During playback, the follower viewing apparatus updates the filed-of-view of the navigable image content at step 1520 based on the navigation data corresponding to the selected "navigation path."

Figure 16:
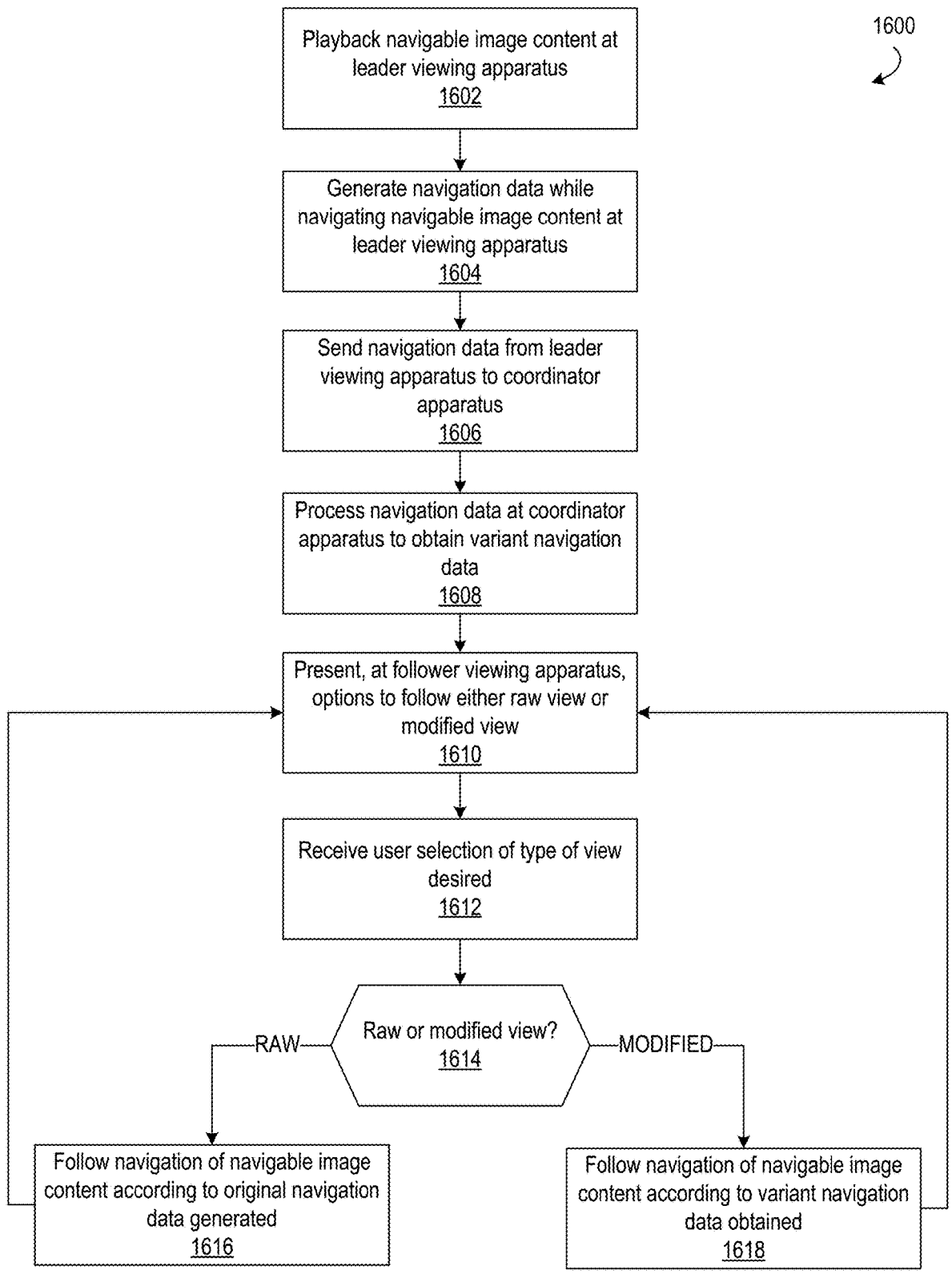
FIG. 16 depicts a flowchart of example method steps for providing guided collaborative viewing of navigable image content.

In FIG. 16, another flowchart 1600 of example method steps for providing guided collaborative viewing is shown. A leader viewing apparatus performs playback of the navigable image content at step 1602 as described above. During playback, the leader viewing apparatus generates navigation data at step 1604 as the leader navigates the navigable image content as also described above. The leader viewing apparatus sends the navigation data to the coordinator apparatus at step 1606 which processes the navigation data to obtain variant navigation data at step 1608. The navigation data generated by the leader viewing apparatus and the variant navigation data obtained by the coordinator device is sent to the follower viewing apparatus which presents options at step 1610 to follow either a "raw view" or a "modified view" of the leader's navigation of the navigable image content. The follower viewing apparatus receives a selection at step 1612 of the type of view the user has selected to follow and determines at step 1614 whether the user selected to follow either the "raw view" or the "modified view." If the user has selected to follow the "raw view," then the follower viewing apparatus follows the leader's navigation of the navigable image content at step 1616 according to the original navigation data generated by the leader viewing apparatus. If the user has selected to follow the "modified view," then the follower viewing apparatus follows the leader's navigation of the navigable image content at step 1618 according to the variant navigation data obtained by the coordinator apparatus. The options to follow either the "raw view" or the "modified view" may be presented at step 1610 throughout playback of the navigable image content at the follower viewing apparatus thereby allowing the user to switch between the "raw view" and the "modified view" as desired.

The steps illustrated in FIGS. 13-16 and described above are provided by way of example only in order to illustrate the principles associated with providing guided collaborative viewing. It will be appreciated with the benefit of this disclosure that specific implementations may include selectively performing steps similar to those illustrated in FIGS. 13-16. It will also be appreciated with the benefit of this disclosure that specific implementations may include, e.g., performing steps in addition to those illustrated in FIGS. 13-16, performing steps that combine multiple steps respectively illustrated in FIGS. 13-16, omitting one or more of the steps illustrated in FIGS. 13-16, and/or performing steps in sequences that differ from the sequences respectively illustrated in FIGS. 13-16.

Figure 17:
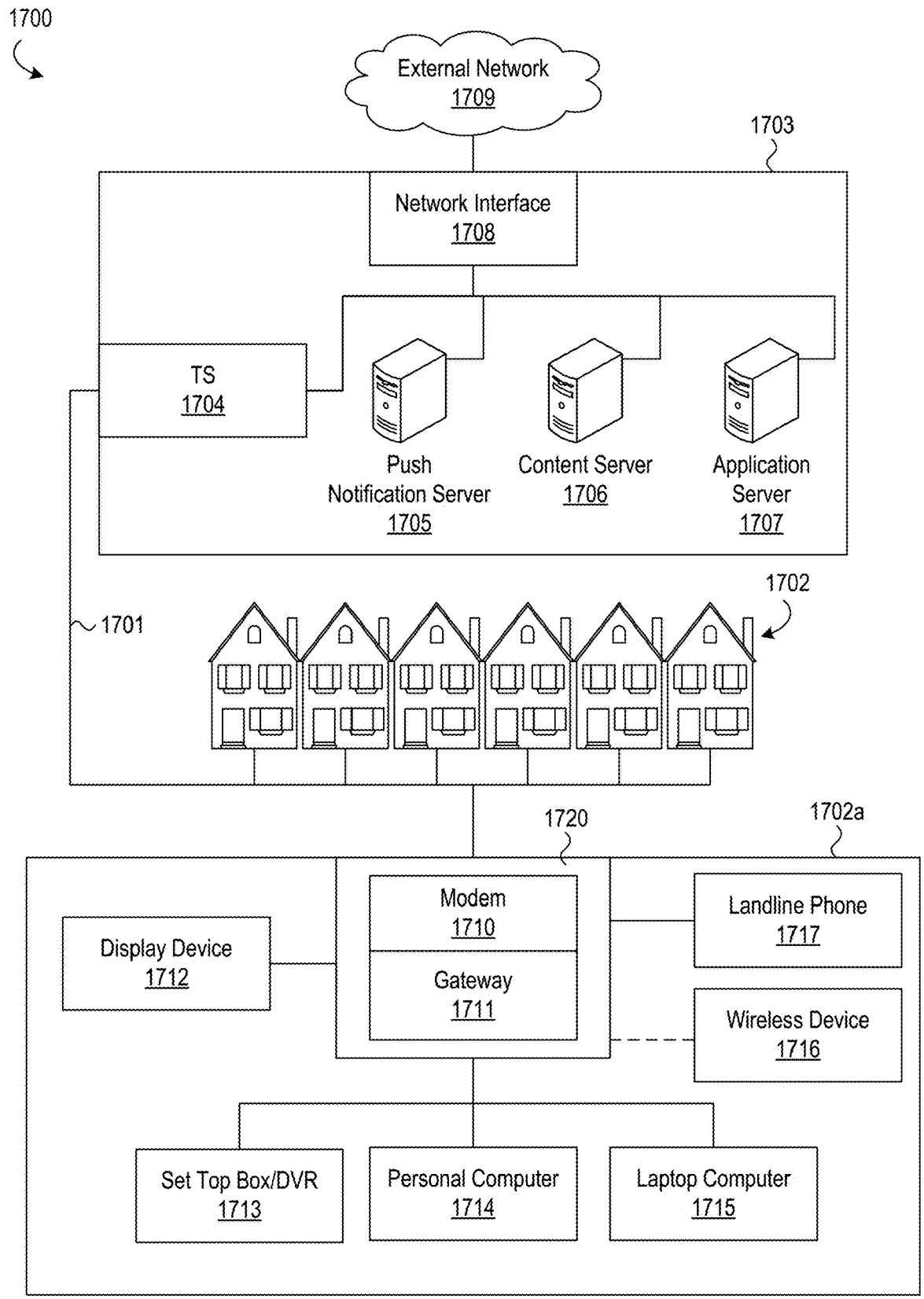
FIG. 17 depicts an example implementation of a communication network.

Referring now, to FIG. 17, an example of an implementation of a communication network on which the disclosures described herein can be implemented is shown. FIG. 17 illustrates an example communication network 1700 on which some or all of the various features described herein may be implemented. The network 1700 may be any type of information distribution network, such as satellite, telephone, cellular, wireless, etc. One example may be an optical fiber network, a coaxial cable network, and/or a hybrid fiber/coax distribution network. The network 1700 also may include multiple types of networks (e.g., Wi-Fi 802.11a-n, Ethernet, 3G, 4G, and 4GLTE) that interconnect. Such networks 1700 use a series of interconnected communication links 1701 (e.g., coaxial cables, optical fibers, wireless, etc.) to connect multiple premises 1702 (e.g., businesses, homes, consumer dwellings, etc.) to a local office or head end 1703. The local office 1703 may transmit downstream information signals onto the links 1701, and each premises 1702 may have a receiver used to receive and process those signals.

There may be one link 1701 originating from the local office 1703, and it may be split a number of times to distribute the signal to various premises 1702 in the vicinity (which may be many miles) of the local office 1703. The links 1701 may include components not illustrated, such as splitters, filters, amplifiers, etc. to help convey the signal clearly, but in general each split introduces a bit of signal degradation. Portions of the links 1701 may also be implemented with fiber-optic cable, while other portions may be implemented with coaxial cable, other lines, or wireless communication paths.

The local office 1703 may include an interface 1704, such as a termination system (TS). More specifically, the interface 1704 may be a cable modem termination system (CMTS), which may be a computing device configured to manage communications between devices on the network of links 1701 and backend devices such as servers 1705-1707 (to be discussed further below). The interface 1704 may be as specified in a standard, such as the DOCSIS standard, published by Cable Television Laboratories, Inc. (a.k.a. CableLabs), or it may be a similar or modified device instead. The interface 1704 may be configured to place data on one or more downstream frequencies to be received by modems at the various premises 1702, and to receive upstream communications from those modems on one or more upstream frequencies.

The local office 1703 may also include one or more network interfaces 1708, which can permit the local office 1703 to communicate with various other external networks 1709. These networks 1709 may include, for example, networks of Internet devices, telephone networks, cellular telephone networks, fiber optic networks, local wireless networks (e.g., WiMAX), satellite networks, and any other desired network, and the network interface 1708 may include the corresponding circuitry needed to communicate on the external networks 1709, and to other devices on the network such as a cellular telephone network and its corresponding cell phones.

As noted above, the local office 1703 may include a variety of servers 1705-1707 that may be configured to perform various functions. For example, the local office 1703 may include a push notification server 1705. The push notification server 1705 may generate push notifications to deliver data and/or commands to the various premises 1702 in the network (or more specifically, to the devices in the premises 1702 that are configured to detect such notifications). The local office 1703 may also include a content server 1706. The content server 1706 may be one or more computing devices that are configured to provide content to users at their premises. This content may be, for example, video on demand movies, television programs, songs, text listings, etc. The content server 1706 may include software to validate user identities and entitlements, to locate and retrieve requested content, to encrypt the content, and to initiate delivery (e.g., streaming) of the content to the requesting user(s) and/or device(s).

The local office 1703 may also include one or more application servers 1707. One or more application servers, e.g. application server 1707, may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, one or more of the application servers may be responsible for collecting television program listings information and generating a data download for electronic program guide listings. One or more of the application servers may be responsible for monitoring user viewing habits and collecting that information for use in selecting advertisements. One or more of the application servers may be responsible for formatting and inserting advertisements in a video stream being transmitted to the premises 1702. One or more of the application servers may be responsible for tracking and collecting billing data associated with various equipment at the premises 1702. Although shown separately, one of ordinary skill in the art will appreciate that the push notification server 1705, content server 1706, and the application server 1707 may be combined. Further, here the push notification server 1705, content server 1706, and application server 1707 are shown generally, and it will be understood that they may each contain computer memory storing computer-executable instructions to cause a processor to perform steps described herein and/or memory for storing data.

An example premise 1702a, such as a home, may include an interface 1720. The interface 1720 can include any communication circuitry needed to allow a device to communicate on one or more links 1701 with other devices in the network. For example, the interface 1720 may include a modem 1710, which may include transmitters and receivers used to communicate on the links 1701 and with the local office 1703. The modem 1710 may be, for example, a coaxial cable modem (for coaxial cable lines 1701), a fiber interface node (for fiber optic lines 1701), twisted-pair telephone modem, cellular telephone transceiver, satellite transceiver, local Wi-Fi router or access point, or any other desired modem device. Also, although only one modem is shown in FIG. 17, a plurality of modems operating in parallel may be implemented within the interface 1720. Further, the interface 1720 may include a gateway device 1711, such as a gateway interface device. The modem 1710 may be connected to, or be a part of, the gateway device 1711. The gateway device 1711 may be a computing device that communicates with the modem(s) 1710 to allow one or more other devices in the premises 1702a, to communicate with the local office 1703 and other devices beyond the local office 1703. The gateway device 1711 may be a set-top box (STB), digital video recorder (DVR), computer server, or any other desired computing device. The gateway device 1711 may also include (not shown) local network interfaces to provide communication signals to requesting entities/devices in the premises 1702a, such as display devices 1712 (e.g., televisions), additional STBs or DVRs 1713, personal computers 1714, laptop computers 1715, wireless devices 1716 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 1717 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 18:
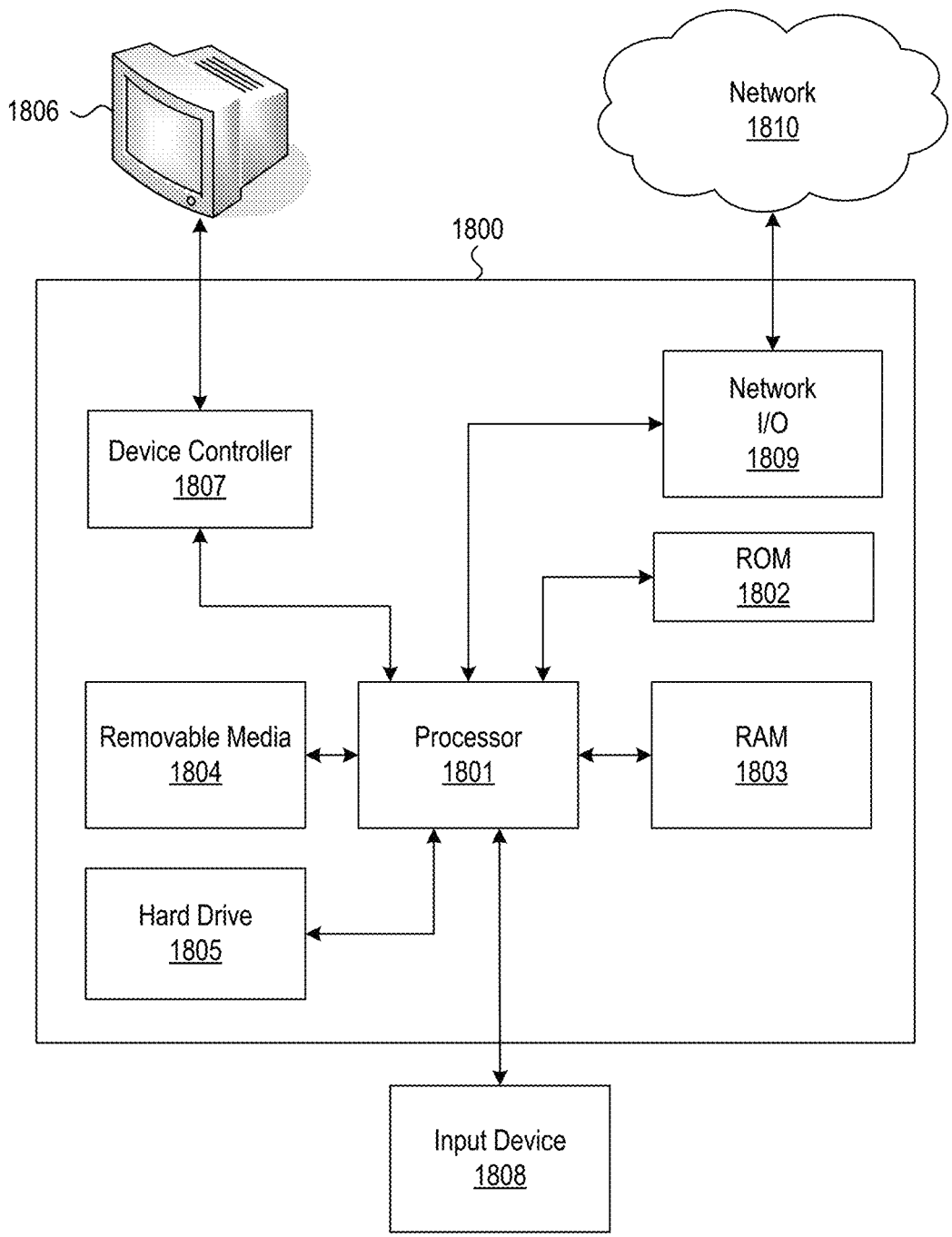
FIG. 18 depicts an example implementation of a computing platform.

In FIG. 18, an example of an implementation of a computing platform on which the disclosures described herein can be implemented is shown. FIG. 18 illustrates general hardware elements that can be used to implement any of the various computing devices discussed herein. The computing device 1800 may include one or more processors 1801, which may execute instructions of a computer program to perform any of the features described herein. The instructions may be stored in any type of computer-readable medium or memory, to configure the operation of the processor 1801. For example, instructions may be stored in a read-only memory (ROM) 1802, random access memory (RAM) 1803, removable media 1804, such as a Universal Serial Bus (USB) drive, compact disk (CD) or digital versatile disk (DVD), floppy disk drive, or any other desired storage medium. Instructions may also be stored in an attached (or internal) hard drive 1805. The computing device 1800 may include one or more output devices, such as a display 1806 (e.g., an external television), and may include one or more output device controllers 1807, such as a video processor. There may also be one or more user input devices 1808, such as a remote control, keyboard, mouse, touch screen, microphone, etc. The computing device 1800 may also include one or more network interfaces, such as a network input/output (I/O) circuit 1809 (e.g., a network card) to communicate with an external network 1810. The network I/O circuit 1809 may be a wired interface, wireless interface, or a combination of the two. In some examples, the network input/output circuit 1809 may include a modem (e.g., a cable modem), and the external network 1810 may include communication links such as communication links 1701 discussed above, the external network 1709 discussed above, an in-home network, a provider's wireless, coaxial, fiber, or hybrid fiber/coaxial distribution system (e.g., a DOCSIS network), or any other desired network. Additionally, the computing device 1800 may include a location-detecting device, such as a global positioning system (GPS) microprocessor 1811, which can be configured to receive and process global positioning signals and determine, with possible assistance from an external server and antenna, a geographic position of the device.

The FIG. 18 example is a hardware configuration, although the illustrated components may be implemented as software as well. Modifications may be made to add, remove, combine, divide, etc. components of the computing device 1800 as desired. Additionally, the components illustrated may be implemented using basic computing devices and components, and the same components (e.g., processor 1801, ROM storage 1802, display 1806, etc.) may be used to implement any of the other computing devices and components described herein. For example, the various components herein may be implemented using computing devices having components such as a processor executing computer-executable instructions stored on a computer-readable medium, as illustrated in FIG. 18. Some or all of the entities described herein may be software based, and may co-exist in a common physical platform (e.g., a requesting entity can be a separate software process and program from a dependent entity, both of which may be executed as software on a common computing device).

The descriptions above are merely example embodiments of various concepts. They may be rearranged, divided, and/or combined as desired, and one or more components or steps may be added or removed without departing from the spirit of the present disclosure. The scope of this patent should only be determined by the claims that follow.

The invention claimed is:

1. A method comprising:
    receiving, by a computing device, first navigation data associated with navigable image content, wherein the first navigation data is indicative of a first navigation path through the navigable image content;
    generating, by the computing device, new content associated with the navigable image content, wherein the new content comprises non-navigable image content and a plurality of navigation paths through the navigable image content;
    receiving, by the computing device from a second device, a request for the navigable image content; and
    sending, to the second device, the first navigation data, the new content, and one or more annotations derived by the computing device based on one or more characteristics of the navigable image content, wherein the second device is configured to
    apply, based on the one or more annotations, one or more effects during output of the navigable image content.

2. The method of claim 1, wherein the first navigation data is configured to cause adjusted output, via the second device, of the navigable image content.

3. The method of claim 1, wherein a subset of the plurality of navigation paths is received from a plurality of devices.

4. The method of claim 1, wherein the request for the navigable image content indicates one or more of:
    timing data;
    one or more reference points; or
    metadata.

5. The method of claim 1, further comprising converting at least one navigation path to a format suitable for display on a two-dimensional display device prior to sending the at least one converted navigation path to the second device.

6. The method of claim 1, wherein one or more of an orientation or a projection of the first navigation data is transformed prior to sending the first navigation data to the second device.

7. The method of claim 1, wherein the first navigation data changes a stability of an image associated with the navigable image content.

8. The method of claim 1, wherein the request for the navigable image content indicates a particular item associated with the navigable image content or a content generator associated with the navigable image content.

9. The method of claim 1, wherein the request for the navigable image content comprises a request for popular navigation data associated with the navigable image content.

10. The method of claim 1, wherein the one or more effects comprise a haptic effect.

11. A method comprising:
    sending, by a computing device to a first device, navigable image content;
    receiving first navigation data indicative of a first navigation of the navigable image content;
    generating, based on the first navigation data, new content associated with the navigable image content, wherein the new content comprises at least one non-navigable image content and second navigation data indicative of a second navigation of the navigable image content; and
    sending, to a second device, the first navigation data, the second navigation data, and one or more annotations derived by the computing device based on one or more characteristics of the navigable image content, wherein the one or more annotations are configured to cause one or more effects to be applied during output of the navigable image content.

12. The method of claim 11, further comprising:
    receiving, by the computing device from the second device, a request for navigation data associated with the navigable image content, wherein sending the first navigation data and the second navigation data is in response to receiving the request.

13. The method of claim 11, wherein the generating the new content is based on one or more of:
    timing data associated with the navigable image content;
    one or more reference points associated with the navigable image content; or
    metadata associated with the navigable image content.

14. The method of claim 11, wherein the second device is configured to receive a user selection of the first navigation data or the second navigation data.

15. The method of claim 11, wherein the output of the navigable image content comprises one or more of:
    a change in an orientation of a view of the navigable image content relative to the first navigation data;

a more stable view of the navigable image content relative to the first navigation data;
a smoother navigation of the navigable image content relative to the first navigation data; or
a different perspective of the navigable image content.

16. The method of claim 11, wherein:
the computing device comprises a server;
the first device is associated with a content generator; and
the second device is associated with a content viewer.

17. The method of claim 11, wherein:
the first device comprises a head-mounted display; and
the first device is configured to generate the first navigation data based on movement of the head-mounted display.

18. The method of claim 11, wherein the one or more effects comprise a haptic effect.

19. A computing device comprising:
one or more processors; and
memory storing instructions that, when executed by the one or more processors, cause the computing device to:
receive first navigation data associated with navigable image content, wherein the first navigation data is indicative of a first navigation path through the navigable image content;
generate new content associated with the navigable image content, wherein the new content comprises non-navigable image content and a plurality of navigation paths through the navigable image content;
receive, from a second device, a request for the navigable image content; and
send, to the second device, the first navigation data, the new content, and one or more annotations derived by the computing device based on one or more characteristics of the navigable image content, wherein the second device is configured to
apply, based on the one or more annotations, one or more effects during output of the navigable image content.

20. The computing device of claim 19, wherein the first navigation data is configured to cause adjusted output, via the second device, of the navigable image content.

21. The computing device of claim 19, wherein the instructions, when executed by the one or more processors, cause the computing device to receive a subset of the plurality of navigation paths from a plurality of devices.

22. The computing device of claim 19, wherein the request for the navigable image content indicates one or more of:
timing data;
one or more reference points; or
metadata.

23. The computing device of claim 19, wherein the the instructions, when executed by the one or more processors, cause the computing device to convert at least one navigation path to a format suitable for display on a two-dimensional display device prior to sending the at least one converted navigation path to the second device.

24. The computing device of claim 19, wherein one or more of an orientation or a projection of the first navigation data is transformed prior to sending the first navigation data to the second device.

25. The computing device of claim 19, wherein the first navigation data changes a stability of an image associated with the navigable image content.

26. The computing device of claim 19, wherein the request for the navigable image content indicates a particular item associated with the navigable image content or a content generator associated with the navigable image content.

27. The computing device of claim 19, wherein the request for the navigable image content comprises a request for popular navigation data associated with the navigable image content.

28. The computing device of claim 19, wherein the one or more effects comprise a haptic effect.

29. A computing device comprising:
one or more processors; and
memory storing instructions that, when executed by the one or more processors, cause the computing device to:
send, to a first device, navigable image content;
receive first navigation data indicative of a first navigation of the navigable image content;
generate, based on the first navigation data, new content associated with the navigable image content, wherein the new content comprises at least one non-navigable image content and second navigation data indicative of a second navigation of the navigable image content; and
send, to a second device, the first navigation data, the second navigation data, and one or more annotations derived by the computing device based on one or more characteristics of the navigable image content wherein
the one or more annotations are configured to cause one or more effects to be applied during output of the navigable image content.

30. The computing device of claim 29, wherein the instructions, when executed by the one or more processors, cause the computing device to receive, from the second device, a request for navigation data associated with the navigable image content, wherein sending the first navigation data and the second navigation data is in response to receiving the request.

31. The computing device of claim 29, wherein the instructions, when executed by the one or more processors, cause the computing device to generate the new content based on one or more of:
timing data associated with the navigable image content;
one or more reference points associated with the navigable image content; or
metadata associated with the navigable image content.

32. The computing device of claim 29, wherein the second device is configured to receive a user selection of the first navigation data or the second navigation data.

33. The computing device of claim 29, wherein the output of the navigable image content comprises one or more of:
a change in an orientation of a view of the navigable image content relative to the first navigation data;
a more stable view of the navigable image content relative to the first navigation data;
a smoother navigation of the navigable image content relative to the first navigation data; or
a different perspective of the navigable image content.

34. The computing device of claim 29, wherein:
the computing device comprises a server;
the first device is associated with a content generator; and
the second device is associated with a content viewer.

35. The computing device of claim 29, wherein:
the first device comprises a head-mounted display; and
the first device is configured to generate the first navigation data based on movement of the head-mounted display.

36. The computing device of claim 29, wherein the one or more effects comprise a haptic effect.

\* \* \* \* \*